United States Patent [19]
Abe

[11] Patent Number: 5,937,098
[45] Date of Patent: *Aug. 10, 1999

[54] ADAPTIVE QUANTIZATION OF ORTHOGONAL TRANSFORM COEFFICIENTS FOR SETTING A TARGET AMOUNT OF COMPRESSION

[75] Inventor: Nobuaki Abe, Hokkaido, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/598,207

[22] Filed: Feb. 6, 1996

[30] Foreign Application Priority Data

Feb. 6, 1995 [JP] Japan .................................. 7-041333
Feb. 6, 1995 [JP] Japan .................................. 7-041334

[51] Int. Cl.$^6$ ................................. G06K 9/36; G06K 9/46
[52] U.S. Cl. ..................... 382/239; 348/405; 358/261.2; 382/245; 382/250; 382/251
[58] Field of Search .................................... 382/232, 239, 382/248, 250, 251; 341/51, 107, 59; 348/403, 404, 405, 420, 419; 358/430, 432, 433, 261.1, 261.2

[56] References Cited

U.S. PATENT DOCUMENTS

| | | |
|---|---|---|
| 4,734,767 | 3/1988 | Kaneko et al. .................... 348/400 |
| 4,974,078 | 11/1990 | Tsai ................................... 348/408 |
| 5,073,820 | 12/1991 | Nakagawa et al. ............... 348/405 |
| 5,146,324 | 9/1992 | Miller et al. ...................... 348/405 |
| 5,282,031 | 1/1994 | Kim ................................... 348/420 |
| 5,349,383 | 9/1994 | Parke et al. ....................... 348/397 |
| 5,359,676 | 10/1994 | Fan .................................... 358/433 |
| 5,369,439 | 11/1994 | Matsuda et al. .................. 348/405 |
| 5,497,246 | 3/1996 | Abe .................................... 358/426 |
| 5,561,719 | 10/1996 | Sugahara et al. ................. 358/430 |
| 5,561,723 | 10/1996 | DesJardins et al. ............... 382/232 |
| 5,563,718 | 10/1996 | Wober et al. ...................... 348/403 |
| 5,621,466 | 4/1997 | Miyane et al. .................... 348/404 |
| 5,708,509 | 1/1998 | Abe .................................... 358/426 |

*Primary Examiner*—Amelia Au
*Assistant Examiner*—Timothy M. Johnson
*Attorney, Agent, or Firm*—Greenblum & Bernstein, P.L.C.

[57] ABSTRACT

An image signal compressing device having a spatial frequency data amount setting unit and a quantization table generation unit. A set data amount is set in the spatial frequency data amount setting unit for each of a plurality of spatial frequencies based on a preset total data amount and a discrete cosine transformation (DCT) data statistical amount corresponding to quantized DCT coefficients using a quantization table in which all quantization coefficients are "1". An amount of encoded data obtained using a predetermined quantization coefficient is estimated in the quantization table generation unit. The predetermined quantization coefficient is adopted as a resultant quantization coefficient of the quantization table when the estimated data is not greater than the set data amount set in the spatial frequency data amount setting unit.

17 Claims, 27 Drawing Sheets

Fig. 2

8 × 8 PIXEL BLOCK $$P(Y)_{xy} = \begin{Bmatrix} 159 & 153 & 158 & 152 & 140 & 138 & 132 & 132 \\ 164 & 162 & 162 & 157 & 151 & 142 & 134 & 132 \\ 167 & 168 & 161 & 160 & 158 & 145 & 139 & 134 \\ 164 & 168 & 161 & 166 & 162 & 152 & 149 & 141 \\ 171 & 166 & 168 & 167 & 163 & 162 & 157 & 151 \\ 173 & 164 & 169 & 170 & 166 & 166 & 162 & 161 \\ 175 & 169 & 172 & 176 & 174 & 172 & 174 & 166 \\ 173 & 172 & 175 & 173 & 180 & 181 & 177 & 172 \end{Bmatrix}$$

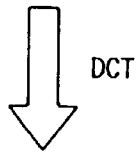
DCT $S(Y)_{00}$  $S(Y)_{10}$  DCT COEFFICIENT $S(Y)_{01}$ $$S(Y)_{uv} = \begin{Bmatrix} 260 & 49 & -16 & 5 & 2 & 4 & 0 & 1 \\ -79 & 36 & -2 & -7 & 1 & -3 & -1 & -2 \\ 0 & -8 & 3 & -2 & -2 & 1 & 5 & 1 \\ -8 & -4 & 5 & -4 & 1 & 7 & 6 & -2 \\ -2 & -6 & -1 & 0 & -4 & -1 & 0 & -1 \\ -3 & -2 & -1 & -1 & 1 & 2 & -5 & -1 \\ -4 & -1 & 1 & 0 & 0 & -2 & 2 & 0 \\ 1 & 1 & 1 & 1 & -1 & 1 & 0 & 0 \end{Bmatrix}$$

$S(Y)_{77}$

QUANTIZATION TABLE $$\begin{Bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{Bmatrix}$$

QUANTIZE←Q(Y)uv=

$R_{00}$  QUANTIZED DCT COEFFICIENT $$R(Y)_{uv} = \begin{Bmatrix} 16 & 4 & -2 & 0 & 0 & 0 & 0 & 0 \\ -7 & 3 & 0 & 0 & 0 & 0 & 0 & 0 \\ 0 & -1 & 0 & 0 & 0 & 0 & 0 & 0 \\ -1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{Bmatrix}$$

Fig. 3

GROUPING OF DIFFERENTIAL VALUES OF DC COMPONENTS

| SSSS CATEGORY | DC DIFFERENTIAL VALUE | NO. OF ADDED BITS |
|---|---|---|
| 0 | 0 | 0 |
| 1 | -1, 1 | 1 |
| 2 | -3, -2, 2, 3 | 2 |
| 3 | -7..-4, 4..7 | 3 |
| 4 | -15..-8, 8..15 | 4 |
| 5 | -31..-16, 16..31 | 5 |
| 6 | -63..-32, 32..63 | 6 |
| 7 | -127..-64, 64..127 | 7 |
| 8 | -255..-128, 128..255 | 8 |
| 9 | -511..-256, 256..511 | 9 |
| 10 | -1023..-512, 512..1023 | 10 |
| 11 | -2047..-1024, 1024..2047 | 11 |

Fig. 4

ENCODING TABLE FOR DIFFERENTIAL DC COMPONENTS

| SSSS CATEGORY | CODE LENGTH | CODE WORD |
|---|---|---|
| 0 | 2 | 00 |
| 1 | 3 | 010 |
| 2 | 3 | 011 |
| 3 | 3 | 100 |
| 4 | 3 | 101 |
| 5 | 3 | 110 |
| 6 | 4 | 1110 |
| 7 | 5 | 11110 |
| 8 | 6 | 111110 |
| 9 | 7 | 1111110 |
| 10 | 8 | 11111110 |
| 11 | 9 | 111111110 |

FOR LUMINANCE COMPONENT

Fig. 7

GROUPING OF AC COMPONENTS

| SSSS CATEGORY | AC COMPONENT VALUE | NO. OF ADDED BITS |
|---|---|---|
| 0 | 0 | 0 |
| 1 | -1, 1 | 1 |
| 2 | -3, -2, 2, 3 | 2 |
| 3 | -7..-4, 4..7 | 3 |
| 4 | -15..-8, 8..15 | 4 |
| 5 | -31..-16, 16..31 | 5 |
| 6 | -63..-32, 32..63 | 6 |
| 7 | -127..-64, 64..127 | 7 |
| 8 | -255..-128, 128..255 | 8 |
| 9 | -511..-256, 256..511 | 9 |
| 10 | -1023..-512, 512..1023 | 10 |

Fig. 8

| R. L. /CATEGORY | C. L. | CODE WORD |
|---|---|---|
| 0/0 (EOB) | 4 | 1010 |
| 0/1 | 2 | 00 |
| 0/2 | 2 | 01 |
| 0/3 | 3 | 100 |
| 0/4 | 4 | 1011 |
| 0/5 | 5 | 11010 |
| 0/6 | 7 | 1111000 |
| 0/7 | 8 | 11111000 |
| 0/8 | 10 | 1111110110 |
| 0/9 | 16 | 1111111110000010 |
| 0/A | 16 | 1111111110000011 |
| 1/1 | 4 | 1100 |
| 1/2 | 5 | 11011 |
| 1/3 | 7 | 1111001 |
| 1/4 | 9 | 111110110 |
| 1/5 | 11 | 11111110110 |
| 1/6 | 16 | 1111111110000100 |
| 1/7 | 16 | 1111111110000101 |
| 1/8 | 16 | 1111111110000110 |
| 1/9 | 16 | 1111111110000111 |
| 1/A | 16 | 1111111110001000 |
| 2/1 | 5 | 11100 |
| 2/2 | 8 | 11111001 |
| 2/3 | 10 | 1111110111 |
| 2/4 | 12 | 111111110100 |
| 2/5 | 16 | 1111111110001001 |
| 2/6 | 16 | 1111111110001010 |
| 2/7 | 16 | 1111111110001011 |
| 2/8 | 16 | 1111111110001100 |
| 2/9 | 16 | 1111111110001101 |
| 2/A | 16 | 1111111110001110 |
| 3/1 | 6 | 111010 |
| 3/2 | 9 | 111110111 |

Fig. 9

```
ZZ( )···0 RUN LENGTH:      -   0   0   1   0   2   0   54
EFFECTIVE COEFFICIENT:    16   4  -7   3  -2  -1  -1
         VALUE
DC VALUE(16)-PRIOR DC VALUE(25)=DIFFERENTIAL(-9) SSSS=4
                                              DC VALUE
                                   CODE WORD FOR SSSS→101
                                        ADDED BITS→0110
ZZ01=( 4) SSSS=(3)RUN LENGTH=(0)
                                   CODE WORD FOR SSSS→100
                                        ADDED BITS→100
ZZ02=(-7) SSSS=(3)RUN LENGTH=(0)
                                   CODE WORD FOR SSSS→100
                                        ADDED BITS→000
ZZ04=( 3) SSSS=(2)RUN LENGTH=(1)
                                   CODE WORD FOR SSSS→11011
                                        ADDED BITS→11
ZZ05=(-2) SSSS=(2)RUN LENGTH=(0)
                                   CODE WORD FOR SSSS→01
                                        ADDED BITS→01
ZZ08=(-1) SSSS=(1)RUN LENGTH=(2)
                                   CODE WORD FOR SSSS→11100
                                        ADDED BITS→0
ZZ09=(-1) SSSS=(1)RUN LENGTH=(0)
                                   CODE WORD FOR SSSS→00
                                        ADDED BITS→0
EOB                                CODE WORD FOR EOB→1010

ENCODED DATA: 1010110100100100000110111101011110000001010
```
HF

```
ZZ( )···0 RUN LENGTH :     -   (0) (0) (1)  0   2   0   54
EFFECTIVE COEFFICIENT:    16   (4)(-7)(3) -2  -1  -1
         VALUE
                                 ↑   ↑   ↑
                                 K1  K2  K4
```

| CATEGORY | 0 | 1 | 2 | 3 | 4 | 5 |
|---|---|---|---|---|---|---|
| S. AMOUNT | 602 | 1088 | 1184 | 605 | 529 | 558 |

| CATEGORY | 6 | 7 | 8 | 9 | 10 |
|---|---|---|---|---|---|
| S. AMOUNT | 371 | 248 | 193 | 22 | 0 |

Fig. 12

| DB0 | DB1 | DB2 | DB3 | DB4 | | | |
|---|---|---|---|---|---|---|---|
| 42238 | 34009 | 33833 | 25920 | 28461 | 28779 | 26676 | 26115 |
| 24853 | 23720 | 21013 | 23192 | 25012 | 25007 | 25277 | 24133 |
| 23961 | 23776 | 22357 | 20537 | 18928 | 16463 | 19945 | 22225 |
| 23104 | 23612 | 23970 | 21883 | 14731 | 23475 | 23992 | 22750 |
| 21352 | 18966 | 16952 | 15630 | 16640 | 18789 | 21901 | 22810 |
| 23176 | 21417 | 14243 | 15279 | 23851 | 23829 | 20584 | 18884 |
| 16298 | 19143 | 21316 | 23143 | 21018 | 14329 | 14764 | 23543 |
| 22741 | 19588 | 21154 | 20150 | 13789 | 14824 | 22202 | 20909 |

| SB0 | SB1 | SB2 | SB3 | SB4 | | | |
|---|---|---|---|---|---|---|---|
| 44240 | 33008 | 35629 | 24042 | 28844 | 30363 | 20576 | 24050 |
| 23096 | 20970 | 14194 | 17131 | 21162 | 17925 | 13980 | 5588 |
| 15976 | 16054 | 14706 | 12145 | 9804 | 1764 | 5591 | 8047 |
| 14726 | 7277 | 2589 | 2037 | 331 | 589 | 2682 | 3686 |
| 2836 | 1552 | 266 | 177 | 100 | 144 | 1099 | 1035 |
| 417 | 237 | 85 | 93 | 136 | 129 | 240 | 109 |
| 69 | 79 | 84 | 87 | 83 | 61 | 91 | 136 |
| 86 | 78 | 84 | 81 | 59 | 64 | 89 | 21600 |

|        | 0    | 1    | 2    | 3    | 4   | 5   | 6   | 7   | 8   | 9   | A  |
|--------|------|------|------|------|-----|-----|-----|-----|-----|-----|-----|
| DC     | 276  | 463  | 909  | 1065 | 463 | 444 | 521 | 610 | 430 | 193 | 26 |
| $AC_1$ | 602  | 1088 | 1184 | 605  | 529 | 558 | 371 | 248 | 193 | 22  | 0  |
| $AC_2$ | 638  | 1149 | 1232 | 600  | 532 | 508 | 352 | 278 | 105 | 6   | 0  |
| $AC_3$ | 853  | 1453 | 1371 | 689  | 490 | 280 | 138 | 113 | 13  | 0   | 0  |
| $AC_4$ | 814  | 1364 | 1271 | 659  | 553 | 399 | 224 | 104 | 12  | 0   | 0  |
| $AC_5$ | 744  | 1319 | 1413 | 687  | 541 | 322 | 197 | 149 | 28  | 0   | 0  |
| $AC_6$ | 698  | 1238 | 1572 | 955  | 506 | 276 | 118 | 35  | 2   | 0   | 0  |
| $AC_7$ | 747  | 1437 | 1466 | 762  | 530 | 275 | 146 | 35  | 2   | 0   | 0  |
| $AC_8$ | 844  | 1478 | 1484 | 712  | 479 | 243 | 127 | 33  | 0   | 0   | 0  |
| $AC_9$ | 921  | 1567 | 1444 | 739  | 453 | 162 | 70  | 43  | 1   | 0   | 0  |
| $AC_{10}$ | 1067 | 1708 | 1573 | 662 | 219 | 109 | 41 | 21 | 0 | 0 | 0 |
| $AC_{11}$ | 944  | 1581 | 1523 | 780 | 374 | 143 | 46 | 9  | 0 | 0 | 0 |
| ⋮      | ⋮    | ⋮    | ⋮    | ⋮    | ⋮   | ⋮   | ⋮   | ⋮   | ⋮   | ⋮   | ⋮  |

Fig. 15

|        | 0    | 1    | 2   | 3   | 4   | 5   | 6  | 7 | 8 | 9 | A |
|--------|------|------|-----|-----|-----|-----|-----|---|---|---|---|
| DC     | 2323 | 1106 | 604 | 666 | 472 | 201 | 28 | 0 | 0 | 0 | 0 |
| $AC_1$ | 3479 | 866  | 519 | 300 | 212 | 24  | 0  | 0 | 0 | 0 | 0 |
| $AC_2$ | 3619 | 850  | 487 | 315 | 119 | 10  | 0  | 0 | 0 | 0 | 0 |
| $AC_3$ | 4366 | 675  | 220 | 121 | 18  | 0   | 0  | 0 | 0 | 0 | 0 |
| $AC_4$ | 4108 | 810  | 341 | 125 | 16  | 0   | 0  | 0 | 0 | 0 | 0 |
| $AC_5$ | 4163 | 747  | 288 | 168 | 34  | 0   | 0  | 0 | 0 | 0 | 0 |
| $AC_6$ | 4463 | 671  | 223 | 41  | 2   | 0   | 0  | 0 | 0 | 0 | 0 |
| $AC_7$ | 4412 | 703  | 228 | 55  | 2   | 0   | 0  | 0 | 0 | 0 | 0 |
| $AC_8$ | 4518 | 633  | 203 | 44  | 2   | 0   | 0  | 0 | 0 | 0 | 0 |
| $AC_9$ | 4671 | 569  | 104 | 55  | 1   | 0   | 0  | 0 | 0 | 0 | 0 |
| $AC_{10}$ | 5010 | 297 | 62 | 31 | 0 | 0 | 0 | 0 | 0 | 0 | 0 |
| $AC_{11}$ | 4828 | 480 | 80 | 12 | 0 | 0 | 0 | 0 | 0 | 0 | 0 |
| ⋮      | ⋮    | ⋮    | ⋮   | ⋮   | ⋮   | ⋮   | ⋮  | ⋮ | ⋮ | ⋮ | ⋮ |

Fig. 16

SCAN AC$_1$

| C[0] = 3479 | C[1~] = 1921 |
|---|---|
| Z[1] = 3479 | Z[0] = 1921 |

Fig. 17

|  | SCAN AC$_2$ | |
|---|---|---|

| SCAN AC$_1$ | | C[0] = 3619 | C[1~] = 1781 |
|---|---|---|---|
| | C'[0] = 3479 | Z[2] = 2332 | Z[0] = 1781 |
| | Z'[0] = 1921 | Z[1] = 1287 | |

Fig. 18

| | SCAN AC$_3$ | |
|---|---|---|
| | C[0]<br>=4366 | C[1~]<br>=1034 |
| C'[0]<br>=3619 | Z[3]<br>=1885<br>Z[2]<br>=1041 | Z[0]<br>=1034 |
| Z'[0]<br>=1781 | Z[1]<br>=1440 | |

SCAN AC$_2$

Fig. 19

| | SCAN AC$_4$ | |
|---|---|---|
| | C[0]<br>=4108 | C[1~]<br>=1292 |
| C'[0]<br>=4366 | Z[4]<br>=1434<br>Z[3]<br>=792<br>Z[2]<br>=1095 | Z[0]<br>=1292 |
| Z'[0]<br>=1034 | Z[1]<br>=787 | |

SCAN AC$_3$

Fig. 20

[SCAN AC$_1$]

CATEGORY

| RUN LENGTH | 0 | 1 | 2 | 3 | 4 | 5 | 6 | 7 |
|---|---|---|---|---|---|---|---|---|
| 0 | - | 866 | 519 | 300 | 212 | 24 | 0 | 0 |
| 1 |  |  |  |  |  |  |  |  |
| 2 |  |  |  |  |  |  |  |  |
| 3 |  |  |  |  |  |  |  |  |
| 4 |  |  |  |  |  |  |  |  |

Fig. 21

[SCAN AC$_2$]

CATEGORY

| RUN LENGTH | 0 | 1 | 2 | 3 | 4 | 5 | 6 | 7 | |
|---|---|---|---|---|---|---|---|---|---|
| 0 | - | 302 | 173 | 112 | 42 | 4 | 0 | 0 | Z[1] |
| 1 | - | 548 | 314 | 203 | 77 | 6 | 0 | 0 | Z[2] |
| 2 |  |  |  |  |  |  |  |  | |
| 3 |  |  |  |  |  |  |  |  | |
| 4 |  |  |  |  |  |  |  |  | |

Fig. 22

[SCAN $AC_3$]

| RUN LENGTH | 0 | 1 | 2 | 3 | 4 | 5 | 6 | 7 | |
|---|---|---|---|---|---|---|---|---|---|
| 0 | – | 223 | 73 | 40 | 6 | 0 | 0 | 0 | Z[1] |
| 1 | – | 161 | 52 | 29 | 4 | 0 | 0 | 0 | Z[2] |
| 2 | – | 291 | 95 | 52 | 8 | 0 | 0 | 0 | Z[3] |
| 3 | | | | | | | | | |
| 4 | | | | | | | | | |
| | | | | | | | | | |

Fig. 23

[SCAN $AC_4$]

| RUN LENGTH | 0 | 1 | 2 | 3 | 4 | 5 | 6 | 7 | |
|---|---|---|---|---|---|---|---|---|---|
| 0 | – | 155 | 65 | 24 | 3 | 0 | 0 | 0 | Z[1] |
| 1 | – | 216 | 91 | 33 | 4 | 0 | 0 | 0 | Z[2] |
| 2 | – | 156 | 66 | 24 | 3 | 0 | 0 | 0 | Z[3] |
| 3 | – | 283 | 119 | 44 | 6 | 0 | 0 | 0 | Z[4] |
| 4 | | | | | | | | | |
| | | | | | | | | | |

Fig. 24

CATEGORY

| | 0 | 1 | 2 | 3 | 4 | 5 | 6 | 7 | 8 | 9 | A |
|---|---|---|---|---|---|---|---|---|---|---|---|
| 0 | 4 | 2 | 2 | 3 | 4 | 5 | 7 | 8 | 10 | 16 | 16 |
| 1 | ·· | 4 | 5 | 7 | 9 | 11 | 16 | 16 | 16 | 16 | 16 |
| 2 | ·· | 5 | 8 | 10 | 12 | 16 | 16 | 16 | 16 | 16 | 16 |
| 3 | ·· | 6 | 9 | 12 | 16 | 16 | 16 | 16 | 16 | 16 | 16 |
| 4 | ·· | 6 | 10 | 16 | 16 | 16 | 16 | 16 | 16 | 16 | 16 |
| 5 | ·· | 7 | 11 | 16 | 16 | 16 | 16 | 16 | 16 | 16 | 16 |
| 6 | ·· | 7 | 12 | 16 | 16 | 16 | 16 | 16 | 16 | 16 | 16 |
| 7 | ·· | 8 | 12 | 16 | 16 | 16 | 16 | 16 | 16 | 16 | 16 |
| 8 | ·· | 9 | 15 | 16 | 16 | 16 | 16 | 16 | 16 | 16 | 16 |
| 9 | ·· | 9 | 16 | 16 | 16 | 16 | 16 | 16 | 16 | 16 | 16 |
| A | ·· | 9 | 16 | 16 | 16 | 16 | 16 | 16 | 16 | 16 | 16 |
| B | ·· | 10 | 16 | 16 | 16 | 16 | 16 | 16 | 16 | 16 | 16 |
| C | ·· | 10 | 16 | 16 | 16 | 16 | 16 | 16 | 16 | 16 | 16 |
| D | ·· | 11 | 16 | 16 | 16 | 16 | 16 | 16 | 16 | 16 | 16 |
| E | ·· | 16 | 16 | 16 | 16 | 16 | 16 | 16 | 16 | 16 | 16 |
| F | 11 | 16 | 16 | 16 | 16 | 16 | 16 | 16 | 16 | 16 | 16 |

RUN LENGTH

```
            J₁₂   J₂₃   J₃₄
            120   159   186   162   132   114
    162 184 236   224   155   141   103   101
     81 107 124   198   251   386   323   194
    150 100  91    91   259   234   114    98
    112 171 254   390   454   348   206   123
    104  95 223   510   286   121   117   171
    296 302 188   109   122   259   532   295
    130 141 153   149   287   568   331   327
                                              )
                                           J₆₂₆₃
```

|  |  |  | $K_{12}$ | $K_{23}$ | $K_{34}$ |  |  |
|---|---|---|---|---|---|---|---|
|  |  |  | 3823 | 3577 | 3280 | 3274 | 3108 | 2675 |
| 3147 | 2899 | 2939 | 2721 | 2394 | 2796 | 2546 | 2931 |
| 2232 | 2550 | 2377 | 2749 | 2575 | 2634 | 2342 | 2323 |
| 2469 | 2034 | 2335 | 2209 | 2599 | 2309 | 2654 | 2557 |
| 2382 | 2589 | 2458 | 2349 | 2346 | 2401 | 2489 | 2404 |
| 2413 | 2132 | 2195 | 2270 | 2456 | 2460 | 2323 | 2316 |
| 2521 | 2437 | 2362 | 1953 | 2398 | 2496 | 2350 | 2373 |
| 2312 | 2366 | 2427 | 2388 | 2213 | 2222 | 2358 | 2262 |

[SCAN AC$_4$]

| [SCAN AC$_3$] | C[0] 4108 | C[1] 810 | C[2] 341 | C[3] 125 | C[4] 16 | C[5] 0 | ... |
|---|---|---|---|---|---|---|---|
| C'[0] =4366 | 3321 | 655 | 276 | 101 | 13 | 0 | ... |
| Z'[0] =1034 | 787 | 155 | 65 | 24 | 3 | 0 | ... |

Fig. 31

| | CATEGORY | | | | | | |
|---|---|---|---|---|---|---|---|
| | 1 | 2 | 3 | 4 | 5~10 | 0 | |
| RUN LENGTH 1 | 277 | 158 | 101 | 13 | 0 | 891 | 1440 |
| 2 | 200 | 115 | 0 | 0 | 0 | 726 | 1041 |
| 3 | 178 | 3 | 0 | 0 | 0 | 1704 | 1885 |
| 0 | 0 | 0 | 0 | 0 | 0 | 1034 | 1034 |
| TOTAL | 655 | 276 | 101 | 13 | 0 | 4355 | |
| | CT$_1$ | CT$_2$ | CT$_3$ | CT$_4$ | | | |

Fig. 32

[SCAN AC₄]

| | 0 | 1 | 2 | 3 | 4 | 5 | 6 |
|---|---|---|---|---|---|---|---|
| 0 | - | 155 | 65 | 24 | 3 | 0 | 0 |
| 1 | - | 277 | 158 | 101 | 13 | 0 | 0 |
| 2 | - | 200 | 115 | 0 | 0 | 0 | 0 |
| 3 | - | 178 | 3 | 0 | 0 | 0 | 0 |

RUN LENGTH

Fig. 35

| $FT_0$ | $FT_1$ | $FT_2$ | | | | | |
|---|---|---|---|---|---|---|---|
| 100 | 102 | 98 | 112 | 104 | 98 | 134 | 112 |
| 112 | 118 | 155 | 142 | 120 | 144 | 184 | 444 |
| 152 | 152 | 156 | 176 | 202 | 1000 | 376 | 278 |
| 160 | 332 | 950 | 1100 | 4800 | 4250 | 900 | 630 |
| 774 | 1270 | 7000 | 10K | 20K | 15K | 2050 | 2210 |
| 5800 | 9600 | 20K | 20K | 20K | 20K | 9200 | 20K |
| 30K | 30K | 30K | 30K | 30K | 30K | 20K | 20K |
| 30K | 30K | 30K | 30K | 30K | 30K | 30K | 30K |

↑ FL $FT_{63}$ (K means 1000)

Fig. 37

FOR LUMINANCE

| | | | | | | | |
|---|---|---|---|---|---|---|---|
| 100 | 102 | 98 | 112 | 104 | 98 | 134 | 112 |
| 112 | 118 | 155 | 142 | 120 | 144 | 184 | 444 |
| 152 | 152 | 156 | 176 | 202 | 1000 | 376 | 278 |
| 160 | 332 | 950 | 1100 | 4800 | 4250 | 900 | 630 |
| 774 | 1270 | 7000 | 10K | 20K | 15K | 2050 | 2210 |
| 5800 | 9600 | 20K | 20K | 20K | 20K | 9200 | 20K |
| 30K | 30K | 30K | 30K | 30K | 30K | 20K | 20K |
| 30K | 30K | 30K | 30K | 30K | 30K | 30K | 30K |

Fig. 38

FOR COLOR DIFFERENCES

| | | | | | | | |
|---|---|---|---|---|---|---|---|
| 240 | 250 | 250 | 305 | 280 | 285 | 400 | 295 |
| 310 | 520 | 1580 | 540 | 450 | 540 | 840 | 820 |
| 970 | 1080 | 1300 | 1490 | 1840 | 2320 | 1830 | 1450 |
| 1200 | 950 | 710 | 690 | 720 | 770 | 1080 | 1430 |
| 1550 | 1920 | 2330 | 2600 | 2340 | 2130 | 1740 | 1370 |
| 1130 | 940 | 760 | 930 | 1130 | 1440 | 1900 | 2330 |
| 2500 | 2360 | 2000 | 1800 | 1420 | 1130 | 1270 | 1600 |
| 2120 | 2200 | 2170 | 2000 | 1590 | 1800 | 2030 | 1000 |

Fig. 39

FOR LUMINANCE

| 350 | 100 | 100 | 100 | 100 | 100 | 100 | 100 |
| --- | --- | --- | --- | --- | --- | --- | --- |
| 100 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |

Fig. 40

FOR COLOR DIFFERENCES

| 200 | 100 | 100 | 100 | 100 | 100 | 100 | 100 |
| --- | --- | --- | --- | --- | --- | --- | --- |
| 100 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |

Fig. 41

FOR LUMINANCE AND COLOR DIFFERENCES

| 100 | 100 | 100 | 100 | 100 | 100 | 100 | 100 |
|---|---|---|---|---|---|---|---|
| 100 | 100 | 100 | 100 | 100 | 100 | 100 | 100 |
| 100 | 100 | 100 | 100 | 100 | 100 | 100 | 100 |
| 2000 | 2000 | 2000 | 2000 | 2000 | 2000 | 2000 | 2000 |
| 10K | 10K | 10K | 10K | 10K | 10K | 10K | 10K |
| 30K | 30K | 30K | 30K | 30K | 30K | 30K | 30K |
| 30K | 30K | 30K | 30K | 30K | 30K | 30K | 30K |
| 30K | 30K | 30K | 30K | 30K | 30K | 30K | 30K |

Fig. 42

FOR LUMINANCE AND COLOR DIFFERENCES

| 8000 | 8000 | 8000 | 8000 | 8000 | 8000 | 8000 | 8000 |
|---|---|---|---|---|---|---|---|
| 8000 | 8000 | 8000 | 8000 | 8000 | 8000 | 8000 | 8000 |
| 8000 | 8000 | 8000 | 8000 | 8000 | 8000 | 8000 | 8000 |
| 30K | 30K | 30K | 30K | 30K | 30K | 30K | 30K |
| 30K | 30K | 30K | 30K | 30K | 30K | 30K | 30K |
| 10K | 10K | 10K | 10K | 10K | 10K | 10K | 10K |
| 100 | 100 | 100 | 100 | 100 | 100 | 100 | 100 |
| 100 | 100 | 100 | 100 | 100 | 100 | 100 | 100 |

ADAPTIVE QUANTIZATION OF ORTHOGONAL TRANSFORM COEFFICIENTS FOR SETTING A TARGET AMOUNT OF COMPRESSION

BACKGROUND OF THE INVENTION

1. Field of the Invention

The present invention is directed to an image signal compressing device for compressing a color still image in accordance with a JPEG (Joint Photographic Expert Group) algorithm.

2. Description of the Related Art

A standardized algorithm for the encoding of high resolution images and the transfer of that information through telecommunication transmission channels has been recommended by the JPEG. In order to enable a large-scale data compression, the baseline process of the JPEG algorithm breaks down the original image data into components on a spatial frequency axis using two-dimensional DCT transformation. Thereafter, data expressed on the spatial frequency axis is quantized, and the quantized data is encoded. In the JPEG encoding algorithm, a predetermined Huffman table is recommended.

In a conventional image signal compressing device, a default quantization table is usually used. Depending upon the object to be photographed, a modified quantization table is obtained by multiplying each quantization coefficient included in the quantization table by a single coefficient.

Since the modified quantization table is obtained by multiplying the single coefficient uniformly in each of the spatial frequencies, a quantization which is in conformity with the characteristics of the image (e.g., when there are many high frequency components in comparison with a low frequency component) cannot be performed. Thus, the image data cannot be compressed without reducing the image quality.

SUMMARY OF THE INVENTION

Accordingly, an object of the present invention is to provide an image signal compressing device by which an image signal compression is performed in accordance with the characteristics of an image to be compressed.

According to the present invention, an image signal compressing device is provided that comprises orthogonal transformation means, quantization means, encoding means, setting means, estimation means, and obtaining means.

The orthogonal transformation means applies an orthogonal transformation to original image data to obtain orthogonal transformation coefficients for each of a plurality of spatial frequencies. The quantization means quantizes the orthogonal transformation coefficients by a quantization table which is composed of first quantization coefficients, so that quantized orthogonal transformation coefficients are obtained. The encoding means encodes the quantized orthogonal transformation coefficients. The encoding means arranges the quantized orthogonal transformation coefficients in a predetermined one-dimensional array with respect to the plurality of spatial frequencies, and then performs an encoding based on the arranged quantized orthogonal transformation coefficients to obtain encoded data for each of the plurality of spatial frequencies. The setting means sets a target value of an amount of the encoded data for each of the plurality of spatial frequencies. The estimation means estimates an amount of the encoded data of a first spatial frequency based on a statistics value of the encoded data of a second spatial frequency. The obtaining means obtains a second quantization coefficient corresponding to the first spatial frequency so that the estimated amount of the encoded data of the first spatial frequency is less than or equal to a predetermined value.

Further, according to the present invention, there is provided an image signal compressing device comprising orthogonal transformation means, quantization means, encoding means, setting means, and obtaining means.

The orthogonal transformation means applies an orthogonal transformation to original image data to obtain orthogonal transformation coefficients for each of the plurality of spatial frequencies. The quantization means quantizes the orthogonal transformation coefficients by a first quantization table which is composed of first quantization coefficients, so that quantized orthogonal transformation coefficients are obtained. The encoding means encodes the quantized orthogonal transformation coefficients. The encoding means arranges the quantized orthogonal transformation coefficients in a predetermined one-dimensional array with respect to the spatial frequencies, and performs an encoding based on the arranged quantized orthogonal transformation coefficients to obtain encoded data for each of the spatial frequencies. The setting means sets a target value of an amount of the encoded data for each of the spatial frequencies, based on a predetermined filtering table and on the quantized orthogonal transformation coefficients obtained by using a second quantization table in which all of second quantization coefficients are "1". The obtaining means obtains a second quantization coefficient corresponding to each of the spatial frequencies so that the amount of the encoded data of the each of the spatial frequencies is less than or equal to a predetermined value.

BRIEF DESCRIPTION OF THE DRAWINGS

The present invention will be better understood from the description of the preferred embodiments of the invention set forth below, together with the accompanying drawings, in which:

FIG. 2 is a view of an example of image data P(Y)xy, a DCT transformation coefficient S(Y)uv, and a quantized DCT coefficient R(Y)uv in the embodiment;

FIG. 3 is a view of a grouping of differential values of the DC component;

FIG. 4 is a view of an encoding table of a DC component;

FIG. 7 is a view showing a grouping of the AC component;

FIG. 8 is a view of an example of data encoded by the Huffman encoding;

FIG. 9 is a view of an example of a Huffman table;

FIG. 12 is a view showing an example of a distribution of a number of bits of encoded data in each Scan when using the quantization table in which all quantization coefficients are "1";

FIG. 13 is a view showing an example of data amount in each of the spatial frequencies, which data amount is set in a spatial frequency data amount setting unit;

FIG. 14 is a view showing a table on which the category distribution shown in FIG. 11 is indicated about each of the Scans;

FIG. 15 is a view showing a category distribution table when using the quantization table in which all of the quantization coefficients are "16";

FIG. 16 is a view showing the number of blocks of the category "0" included in Scan $AC_1$, and the number of blocks in which the category is larger than or equal to "1";

FIG. 17 is a view showing the number of blocks in which the run lengths are 2, 1, and 0 as far as Scan $AC_2$;

FIG. 18 is a view showing the number of blocks in which the run lengths are 3, 2, 1, and 0 as far as Scan $AC_3$;

FIG. 19 is a view showing the number of blocks in which the run lengths are 4, 3, 2, 1, and 0 as far as Scan $AC_4$;

FIG. 20 is a run length/category table of Scan $AC_1$;

FIG. 21 is a run length/category table of Scan $AC_2$;

FIG. 22 is a run length/category table of Scan $AC_3$;

FIG. 23 is a run length/category table of Scan $AC_4$;

FIG. 24 is a view showing a code length of each of the code words of a Huffman table recommended by the JPEG;

FIG. 30 is a view showing an example of a category distribution in Scan $AC_4$;

FIG. 31 is a view showing an example of a distribution of the run length/category obtained by a third estimation method;

FIG. 32 is a view showing a table of a distribution of the run length/category shown in FIG. 31, in a format used in FIG. 23;

FIG. 35 is a view showing an example of a filtering table;

FIG. 37 is a view showing a filtering table which corresponds to a first low-pass filter and is used for luminance;

FIG. 38 is a view showing a filtering table which corresponds to the first low-pass filter and is used for color differences;

FIG. 39 is a view showing a filtering table which corresponds to an averaging filter and is used for luminance;

FIG. 40 is a view showing a filtering table which corresponds to the averaging filter and is used for color differences;

FIG. 41 is a view showing a filtering table corresponding to a second low-pass filter; and FIG. 42 is a view showing a filtering table corresponding to a high-pass filter.

DESCRIPTION OF THE PREFERRED EMBODIMENTS

Figure 1:
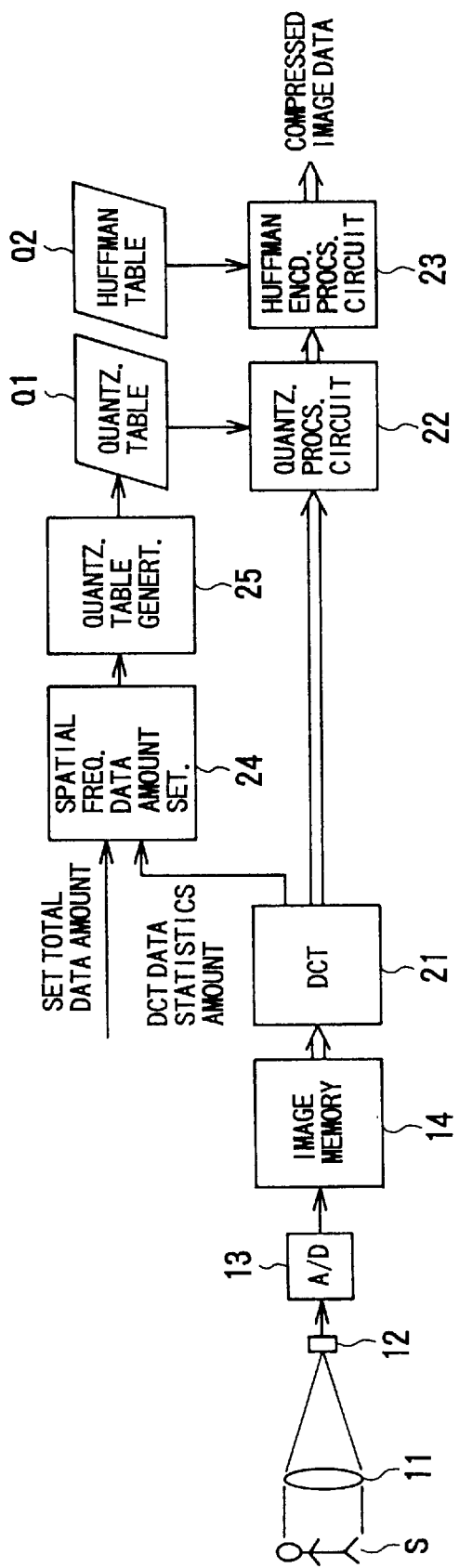
FIG. 1 is a block diagram showing an image compression device of an embodiment of the present invention.

The present invention will be described below with reference to embodiments shown in the drawings.

FIG. 1 is a block diagram of an image signal compressing device of a first embodiment of the present invention.

Light coming from a subject S is converged by a condenser lens 11 and an image of the subject is formed on the light receiving surface of a CCD (charge coupled device) 12. On the light receiving surface of the CCD 12 are disposed a large number of photoelectric conversion elements. Further, on the tops of the photoelectric conversion elements there is provided, for example, a color filter comprised of one of a R (red), G (green), or B (blue) color filter element. Each of these photoelectric conversion elements correspond to a single pixel of data. The subject image is converted into electrical signals corresponding to predetermined colors by the photo-electric conversion elements and these signals are then inputted into an A/D converter 13. Note that in the configuration of FIG. 1, only one CCD 12 is shown, but configurations with two or more CCDs are also possible.

The signals converted from an analog to digital format in the A/D converter 13 are converted into luminance signals Y and differential color signals Cb and Cr by a signal processing circuit, not shown, and are then inputted to an image memory 14. The image memory 14 is divided into mutually independent memory areas for separately storing the luminance signals Y and the differential color signals Cb and Cr. Each memory area has one image's worth of storage capacity.

The luminance signal Y and differential color signals Cb and Cr read out from the image memory 14 are inputted into a DCT processing circuit 21 for data compression processing. In the DCT processing circuit 21, the luminance signal Y and the rest of the original image data are subjected to a discrete cosine transformation (hereinafter referred to as "DCT"). That is, in this embodiment, a DCT transformation is utilized as the orthogonal transformation of the original image data. Note that in FIG. 1, the DCT processing circuit 21 is shown as a single processing circuit, but in actuality, independent DCT processing circuits are provided for the luminance signal Y and differential color signals Cb and Cr.

The image signal compression device includes the DCT processing circuit 21, a quantization processing circuit 22, a Huffman encoding processing circuit 23, a spatial frequency data amount setting unit 24, and a quantization table generation unit 25. In the DCT processing circuit 21, the quantization processing circuit 22, and the Huffman encoding processing circuit 23, the luminance signal Y and the rest of the image data are divided into a plurality of blocks for one image frame and are processed in units of blocks. Each block is comprised of an 8×8 matrix of pixel data.

The DCT coefficients of the luminance signal Y and the differential color signals Cb and Cr obtained in the DCT processing circuit 21 are inputted into the quantization processing circuit 22. A quantization processing circuit 22, like the DCT processing circuit 21, is provided for each type of signal. The DCT coefficients of the luminance signal Y and of the differential color signals Cb and Cr are inputted into the quantization processing circuit 22, and are quantized by quantization tables Q1 comprised of 8×8 matrices of quantization coefficients. The quantization is a linear quantization; that is, the DCT coefficients are divided by the corresponding quantization coefficients.

Note that in the embodiment, the quantization table Q1 used for the DCT coefficient of the luminance signal Y and the quantization table Q1 used for the quantization of the DCT coefficients of the differential color signals Cb and Cr are each different in accordance with the JPEG algorithm, but the same quantization table Q1 may be used for all signals. These quantization tables Q1 are generated in the spatial frequency data amount setting unit 24 and the quantization table generation unit 25, and are optimum ones which are in conformity with characteristics, such as, for example, a spatial frequency distribution, of the original image data, as described later.

The quantized DCT coefficients of the luminance signal Y and of the differential color signals Cb and Cr outputted from the quantization processing circuit 22 are inputted to the Huffman encoding processing circuit 23 where they are then Huffman encoded by a predetermined algorithm.

The compressed image signals obtained by this Huffman encoding are recorded in an IC memory card (a recording medium-not shown).

FIG. 2 shows as an example image data of a luminance signal P(Y)xy of an 8×8 block of pixels, DCT coefficients S(Y)uv, quantized DCT coefficients R(Y)uv, and a quantization table Q(Y)uv.

The image data P(Y)xy is converted to 64 (=8×8) DCT coefficients S(Y)uv by the two-dimensional DCT transformation. Of these DCT coefficients, the DCT coefficient $S(Y)_{00}$ at the position (0,0) is the DC (Direct Current) component, while the remaining 63 DCT coefficients S(Y)uv are the AC (Alternating Current) components. The AC components show how many higher spatial frequency components there are in the 8×8 pixel block of image data from the coefficient $S(Y)_{01}$ and $S(Y)_{10}$ to the coefficient $S(Y)_{77}$. The DC component shows the average value of the spatial frequency components of the 8×8 pixel block as a whole. Each DCT coefficient S(Y)uv corresponds to a predetermined spatial frequency.

The quantization table Q(Y)uv is used in the quantization processing circuit 22. Separate quantization tables Q(Y)uv may, for example, be used for the luminance signal Y and the differential color signals Cb and Cr. In this case, when recording the JPEG format image data in the recording medium, the content of the quantization table Q(Y)uv that was used for the quantization of the component data is also recorded, at an address corresponding to the address of the component data.

The equation for quantization of the DCT coefficients of S(Y)uv using the quantization table Q(Y)uv is defined as follows:

$$R(Y)uv = \text{round}(S(Y)uv/Q(Y)uv) \quad (0 \leq u, v \leq 7)$$

"round" in this equation is an approximation function, which approximates, to the nearest integer, the value of the argument. Thus, if the argument is less than 0.5, the value is rounded down to the nearest integer. If the argument is greater than or equal to 0.5, the value is rounded up to the nearest integer. For example, the value 3.49 is rounded to 3, whereas 3.50 is rounded to 4. Namely, the quantized DCT coefficients R(Y)uv shown in FIG. 2 are obtained by dividing each of the DCT coefficients S(Y)uv by the quantization coefficients Q(Y)uv, and rounding off.

The quantized DCT coefficients R(Y)uv, R(Cb)uv, and R(Cr)uv obtained in the quantization processing circuit 22 in this way are inputted to the Huffman encoding processing circuit 23.

Next, an explanation will be made of the Huffman encoding in the Huffman encoding processing circuit 23, using FIG. 3 through FIG. 7. In the following explanation, a quantized DC coefficient means a DC component quantized by a quantization table for the DC component, and a quantized AC coefficient means an AC component quantized by a quantization table for the AC component.

The encoding methods are different for the quantized DC component $R(Y)_{00}$ and the quantized AC components (i.e. the quantized DCT coefficients R(Y)uv other than the quantized DC component $R(Y)_{00}$). The encoding of the quantized DC component $R(Y)_{00}$ is performed as follows:

First, the difference in value between the quantized DC component $R(Y)_{00}$ of the block currently to be encoded, and the value of the quantized DC component $R(Y)_{00}$ of the block previously encoded is obtained. It is judged in which category shown in FIG. 3 this difference falls. The code word corresponding to the category is obtained from the encoding table (DC component encoding table) shown in FIG. 4. For example, if the quantized DC component $R(Y)_{00}$ of the block currently to be encoded is 16 and the quantized DC component $R(Y)_{00}$ of the block previously encoded is 25, the difference is −9, so it is judged from the category table of FIG. 3 that the category in which the difference −9 falls is "4" and further, it is judged from the encoding table of FIG. 4 that the code word of category 4 is "101".

Then, what number the difference is in the DC differential value sequence of the category from the category table of FIG. 3 is expressed by the added bits. For example, the difference=−9 is the seventh from the smallest in the category=4, so the added bits are "0110", wherein the smallest added bits are "0000". That is, category 4 in FIG. 3 represents the values −15 to −8 and 8 to 15. Counting from the smallest value (e.g. −15) to the desired value −9 (e.g., −15, −14, −13, −12, −11, −10, −9), results in seven counts. Category 4 has 4 added bits. Thus, count one results in the added bits "0000", count two results in the added bits "0001", . . . , count seven results in the added bits "0110". Accordingly, the Huffman code word of the quantized DC component $R(Y)_{00}$ of the block currently being encoded is "1010110" ("101" representing the code word of category 4 and "0110" as the added bits for the seventh count).

Figure 5:
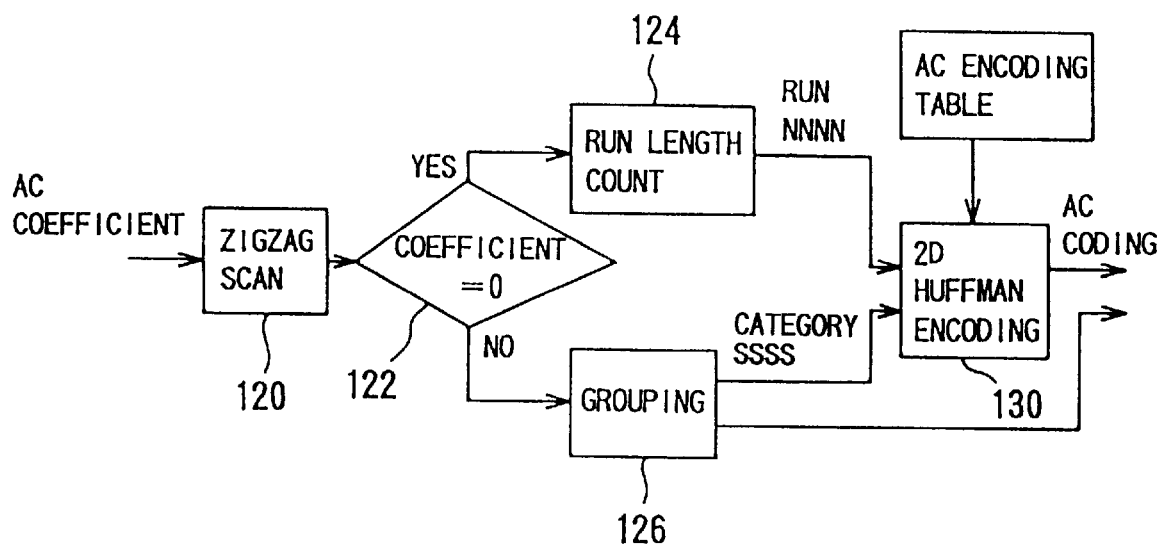
FIG. 5 is a flow chart of a processing routine for encoding quantized AC component.
Figure 6:
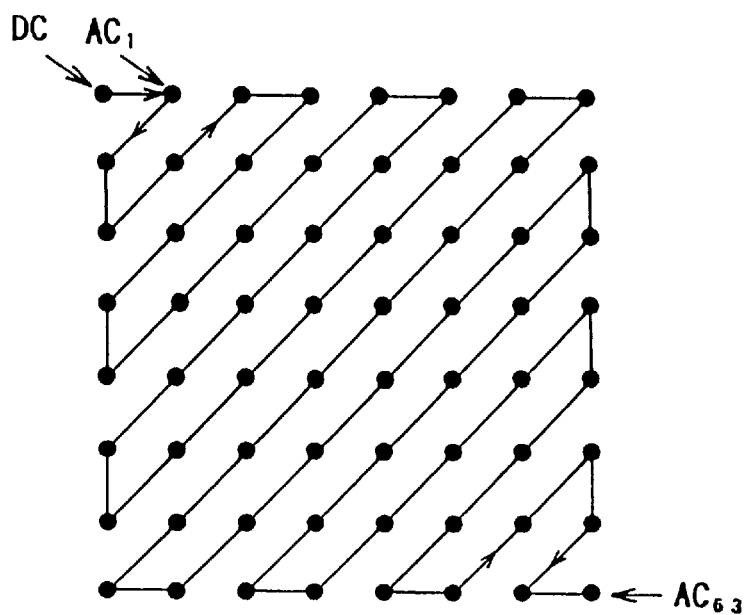
FIG. 6 is a view of a zigzag scan in a Huffman encoding of the AC component.

On the other hand, the encoding of the quantized AC component is performed by the processing routine shown in FIG. 5. First, in step 120, 63 quantized AC components are zigzag scanned in the order shown in FIG. 6 and are rearranged into one-dimensional array data. In the following explanation, the quantized AC components are called Scan $AC_1, AC_2, \ldots AC_{63}$ in the order of the zigzag scan. Then, in step 122, it is judged if each quantized AC component arranged one dimensionally is "0" or not. When a quantized AC component is "0", in step 124, the number of consecutive quantized AC components equal to "0" are counted. From this, the length of consecutive "0"'s, that is, the run length, is obtained.

Conversely, when it is judged in step 122 that the quantized AC component is not "0", step 126 is performed to classify the same as with the quantized DC component and the added bits are found. This grouping of the quantized AC components differs from the grouping of the quantized DC component and is performed on the quantized AC components themselves. Namely, when the quantized AC component is for example "4", the table shown in FIG. 7 is referred to in order to obtain the category "3". Further, the quantized AC component "4" is the fifth from the smallest in the group of the category=3, so the added bits become "100", wherein the smallest added bits are "000".

In step 130, the AC encoding table (FIG. 8) of the Huffman table is referred to. When the run length of the data just before the quantized AC component "4" is 0, the code word "100" is obtained from the run length and the category=3. Further, the two-dimensional Huffman code word "100100" is obtained by combining this code word "100" and the added bits "100" obtained in step 126.

The result of Huffman encoding of the quantized DCT coefficients of FIG. 2 is shown as the encoded data HF of FIG. 9.

Figures 10, 11:
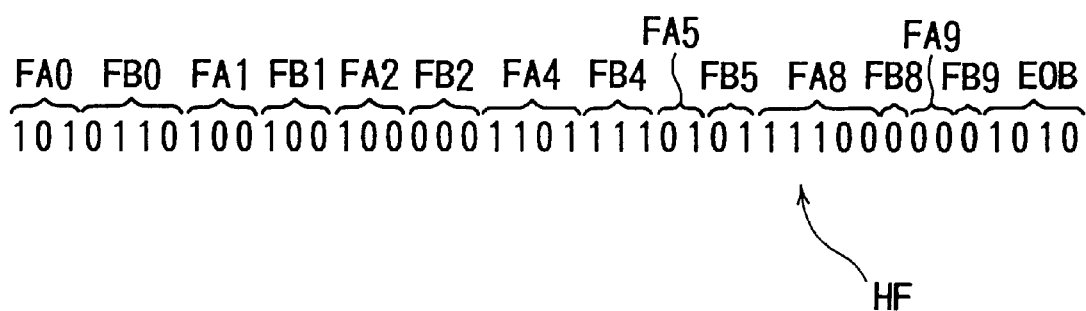
FIG. 10 is a view showing components of encoded data.
FIG. 11 is a view showing an example of a category distribution in a predetermined spatial frequency when using a quantization table in which all quantization coefficients are "1"

FIG. 10 shows the encoded data HF shown in FIG. 9. Such encoded data HF is obtained for each of the blocks. When one image frame is composed of 5400 blocks, for example, the number of encoded data HF obtained is 5400.

As described above, the encoded data HF is composed of encoded data regarding 1 quantized DC component and encoded data regarding 63 quantized AC components. The encoded data regarding the quantized DC component is composed of a code word FA0 and an added bit FB0 which correspond to the category. The encoded data regarding the quantized AC component is composed of a code word (FA1, for example) and added bits (FB1, for example) which correspond to the run length and the category.

The encoded data regarding the quantized AC coefficient will be described below in detail.

In the example shown in FIG. 9, as an encoded data which is obtained based on the fact that Scan $AC_1$ is 4 and the run length is 0 (see reference K1 in FIG. 9), a code word FA1 and an added bit FB1 which correspond to the run length and the category are generated. Further, as an encoded data which is obtained based on the fact that Scan $AC_2$ is −7 and the run length is 0 (see reference K2 in FIG. 9), a code word FA2 and an added bit FB2 are generated.

Since Scan $AC_3$ is 0, a code word and added bit do not exist for Scan $AC_3$. After the added bit FB2, as an encoded data which is obtained based on the fact that Scan $AC_4$ is 3 and the run length is 1 (see reference K4 in FIG. 9), a code word FA4 and an added bit FB4 which correspond to the run length and the category are generated.

In the same way, a code word FA5 and an added bit FB5, a code word FA8 and an added bit FB8, and a code word FA9 and an added bit FB9 are generated. An end data (EOB) indicates that only 0s are continued after Scan $AC_{10}$.

Generation of the quantization table Q1 will be described below.

As shown in FIG. 1, the quantization table Q1 is generated based on a preset total data amount and a DCT data statistics amount. The preset total data amount is the total number of bits of the encoded data HF of one image frame which is recorded in a recording medium, for example 524288 bits (64K bytes). The DCT data statistics amount is obtained based on output data of the DCT processing circuit 21. The output data of the DCT processing circuit 21 is obtained by DCT-converting the original image data, and is equivalent to data obtained by quantizing using a quantization table Q1 in which the 8×8 matrix quantization coefficients are all "1", this quantization table Q1 being referred to as a default quantization table hereinafter. The output data is zigzag scanned (see FIG. 6), and then, after the run length and the category are obtained (see FIG. 5), the DCT data statistics amount is obtained by finding the bit length for each of the spatial frequencies with reference to a table shown in FIG. 24, to be described below. This DCT data statistics amount means the category distribution shown in FIG. 11 and a distribution of an amount of encoded data in each Scan shown in FIG. 12.

FIG. 11 shows an example of a category distribution, i.e., the number of blocks classified to each of the categories, in a predetermined spatial frequency (Scan $AC_1$, for example) when using the default quantization table. In one image frame, the category distribution includes a distribution regarding the DC component and distributions regarding the 63 AC components. Namely, 64 category distributions are generated for one image frame. In this embodiment, the original image is divided into 5400 blocks, and in the example shown in FIG. 11, the number of blocks in which the category is 0 is 602, and the number of blocks in which the category is 1 is 1088, etc.

FIG. 12 is an example of the distribution of the number of bits of encoded data HF in each Scan when using the default quantization table, and shows the total number of bits in each of the spatial frequencies for all of the blocks of one image frame. In the DC component, for example, the total number of bits of the code word FA0 and the added bit FB0 (see FIG. 10) is 42238 (reference DB0). In Scan $AC_1$, the total number of bits of the code word FA1 and the added bit FB1 is 34009 (reference DB1), and in Scan $AC_2$, the total bits of the code word FA2 and the added bit FB2 is 33833 (reference DB2). Regarding Scan $AC_3$, although the code word and the added bit do not exist in the example of FIG. 10, the total number of bits is 25920 (reference DB3) since the code word and the added bit exist in other blocks. Thus, data is generated for all Scans up to and including the total number of bits 20909 (reference DB63) for Scan $AC_{63}$.

The preset total data amount and the DCT data statistics amount are inputted into the spatial frequency data amount setting unit 24, in which a distribution of the amount of encoded data in each of the spatial frequencies (i.e., in each of the Scans) as shown in FIG. 13 for example, is set. Namely, the amount of encoded data of the DC component is 44240 bits (reference SB0), the amount of the encoded data of Scan $AC_1$ is 33008 bits (reference SB1), the amount of the encoded data of Scan $AC_2$ is 35629 bits (reference SB2), and the amounts of the encoded data as far as Scan $AC_{63}$ (reference SB63) are set. The total value of these amounts of encoded data, i.e., the preset total data amount is set to a predetermined value (524288 bits in the example of FIG. 13).

The amounts of encoded data represent target values for Scans. The target values define a degree of compression by which each amount of encoded data is compressed, and is replaceable by the amount of encoded data for each of the spatial frequencies. In the image signal compressing device of the present invention, the quantization table Q1 is generated in such a manner that the amount of encoded data in each of the spatial frequencies conforms to the target value, as described later. Namely, the distribution of the amount of encoded data is a target value of the amount of encoded data in each of the spatial frequencies in the Huffman encoded data when the quantization table Q1, which is finally generated in this image signal compressing device, is used. When a high frequency component should be cut off, for example, the distribution of the amount of encoded data is set so that the amount of encoded data regarding the high frequency component is reduced. Note that the amount of encoded data in each of the spatial frequencies is set so that the reproduced image becomes as close to the original image as possible, by, for example, trial and error.

In the spatial frequency data amount setting unit 24, the upper limit of the amount of encoded data in each of the spatial frequencies may be set by using the distribution of the amount of encoded data in each of the Scans, which distribution is included in the DCT data statistics amount. For example, although the total number of bits of Scan $AC_4$ is set to 28844 (reference SB4) in FIG. 13, the total number may be limited to 28461 bits (see reference DB4 in FIG. 12)

based on the data amount distribution of the DCT data statistics amount.

In the quantization table generation unit 25, each of the quantization coefficients included in the quantization table Q1 is generated based on the DCT data statistics amount and on input data from the spatial frequency data amount setting unit 24.

The quantization coefficients regarding the DC component are generated as follows:

First, the DC components of all of the blocks are quantized using the default quantization table in which all of the quantization coefficients are 1. Then, a difference value between the quantization coefficient of the first block for which the quantization coefficient is currently to be obtained and the quantization coefficient of the second block, which is prior to the first block by one block, is obtained.

It is judged in which category shown in FIG. 3 the difference value falls, so that the code word indicating the category is obtained from the encoding table (DC component encoding table) shown in FIG. 4. Further, the added bit corresponding to the difference value is obtained from the category table of FIG. 3. For example, when the category of the difference is "2", the code length is 3 bits and the number of the added bits is 2. Therefore, the amount of encoded data of the quantized DC component in which the category of the difference value is "2" is 5 bits.

Thus, the amount of encoded data of the quantized DC coefficient is obtained for each of the blocks, and the total amount of encoded data (the total number of bits) is obtained. If the total amount of encoded data is less than or equal to the amount of data (reference SB0) of the DC component shown in FIG. 13, the quantization coefficient at that time is determined as the final (or resultant) quantization coefficient. Conversely, if the total amount of encoded data is larger than the amount of encoded data (reference SB0), the quantization coefficient is changed to 2, and then, using the new quantization coefficient, a comparison of the total number of bits described above is performed by using the new quantization coefficient.

The number of blocks falling into each of the categories must be estimated to obtain the total number of bits by using the new quantization coefficient, since the DCT transformation is not performed every time the quantization coefficient is changed; the DCT transformation being performed only for the original image in order to reduce the processing time. Namely, a category distribution table shown in FIG. 15 must be obtained in advance.

An example of how to obtain this category distribution table (e.g., estimating the number of blocks falling into each of the categories) will be described with reference to FIG. 3: assume the difference value falls in, for example, category "2", containing the values −3, −2, 2, and 3. If the quantization coefficient is changed from 1 to 2, the difference value "2" becomes 2/2=1, which falls in category "1". This is the same with the difference value "−2". On the other hand, the difference value "3" becomes 3/2=1.5, which is rounded up to 2, to remain in category "2". This is the same with the difference value "−3". Therefore, in this example, half of the difference values that fell in category "2" when the quantization coefficient was 1 are changed to fall in category "1" when the quantization coefficient changes to 2, with the remaining half staying in category "2". Thus, the category distribution in a state in which the quantization coefficient is changed is estimated, and the total amount of encoded data is obtained by using the table of the estimated category distribution.

The quantization coefficients regarding the AC component is generated as follows:

In the AC component, data relating to the run length in the Huffman encoded data (see reference FA1, FA2, and FA4, for example, in FIG. 10) is included, and the run length is changed when the quantization coefficient is changed. Therefore, the data amount of each of the Scans in a state in which the quantization coefficient is changed cannot be estimated based only on the data amount of the Scan in a state in which the quantization coefficient has not been changed. Therefore, in this embodiment, as described below, the data amount of each of the Scans in a state in which the quantization coefficient is changed is estimated using the category distribution table, and the quantization coefficient is determined based on the estimated value.

FIG. 14 shows an example of a table on which the category distribution shown in FIG. 11 is indicated about each of the Scans. This category distribution table shows the number of blocks which are classified to each of the categories in each of the spatial frequencies when using the default quantization table. Note that, in FIG. 14, the category distributions of the DC component and Scans $AC_1$ through $AC_{11}$ are indicated, and the category distributions from Scans $AC_{12}$ through $AC_{63}$ are omitted. In FIG. 14, the numerals indicated at the top column mean the category. For example, in Scan $AC_1$, the number of blocks of the category "0" is 602, and the number of blocks of the category "1" is 1088.

FIG. 15 shows a category distribution table when using a quantization table in which all of the quantization coefficients are "16", which quantization table is different from that of FIG. 14. As understood from FIG. 7, the AC component values corresponding to the categories "0" through "3" when using the quantization coefficient "1" are changed to 0 (i.e., less than ½) if the quantization coefficient "16" is used, and therefore, the categories of the AC component values are changed to "0". Namely, the 3479 blocks of the category "0" included in Scan $AC_1$ shown in FIG. 15 correspond to 602, 1088, 1184, and 605 blocks included in the categories "0" through "3" shown in FIG. 14.

Similarly, the AC component value corresponding to the category "4" when using the quantization coefficient "1" is changed to −1 or 1 if the quantization coefficient "16" is used, and therefore, the category of the AC component value is changed to "1". On the other hand, the AC component value corresponding to the category "5" when using the quantization coefficient "1" is changed to 1 or 2 if the quantization coefficient "16" is used. Therefore, when using the quantization coefficient "16", the category of the AC component value of some of the blocks is changed to "1", and the category of the AC component value of the remaining blocks is changed to "2". Namely, the 866 blocks of the category "1" included in Scan $AC_1$ shown in FIG. 15 correspond to the 529 blocks of the category "4" and some of the blocks of the category "5" shown in FIG. 14. Thus, when the quantization coefficient is changed, all blocks belonging to a category are not necessarily changed to the other category, but may be changed to different categories.

With reference to FIGS. 16 through 19, an estimation of the number of blocks in which the categories of Scans $AC_{i-1}$ and $AC_i$ are "0" will be described below.

In FIGS. 16 through 19, C(0) shows the number of blocks of category "0" in the present Scan, and C(1~) shows the number of blocks of the categories "1" or more in the present Scan. Z(k) is an estimated value of the number of blocks in which the run length is "k". C'(0) shows the number of blocks of the category "0" in the immediately previous Scan, and Z'(0) shows the number of blocks of the category "0" in the immediately previous Scan.

FIG. 16 shows the number of blocks of the category "0" included in Scan $AC_1$, and the number of blocks in which the category is larger than or equal to "1". In Scan $AC_1$, as shown in FIG. 15, the number of blocks C(0) of the category 1011 is 3479, and the number of blocks C(1~) in which the category is larger than or equal to "1" is 1921 (=5400−3479). Therefore, in Scan $AC_1$, the number of blocks Z(1) in which the run length is 1 is 3479, and the number of blocks Z(0) in which the run length is 0 is 1921.

FIG. 17 shows the number of blocks in which the run lengths are 2, 1, and 0 as far as Scan $AC_2$. In Scan $AC_2$, as shown in FIG. 15, the number of blocks C(0) of the category "0" is 3619, and the number of blocks C(1~) in which the category is larger than or equal to "1" is 1781 (5400−3619). Although it is clear that the number of blocks Z(0) in which the run length is 0 is 1781, it is not clear about the number of blocks Z(2) in which the run length is 2, nor the number of blocks Z(1) in which the run length is 1.

In the present invention, it is supposed that a ratio of the number of blocks Z(2) to the number of blocks Z(1) is equal to the ratio of the number of blocks Z(1), in which the run length in Scan $AC_1$ is 1, to the number of blocks Z(0), in which the run length in Scan $AC_1$ is 0. Under this assumption, the numbers for blocks Z(2) and Z(1) are estimated. Namely, in the embodiment, it is supposed that the number of blocks in which the categories are "0" both in Scans $AC_1$ and $AC_2$ is related to the number of blocks of the category "0" in Scan $AC_1$. Thus, if one assumes that Z(2) has 2332 blocks, the ratio of 3479:1921 will be equal to the ratio of 2332:Z(1). Solving for Z(1) yields 1287 blocks, as shown in FIG. 17.

The number of blocks Z(2) obtained in the way described above corresponds to Scan $AC_2$ in a situation in which the categories of Scans $AC_1$ and $AC_2$ are both "0". The number of blocks Z(1) corresponds to Scan $AC_2$ in which the category is "0", in a situation in which the category of Scan $AC_1$ is other than "0".

FIG. 18 shows the number of blocks in which the run lengths are 3, 2, 1, and 0 as far as Scan $AC_3$. In Scan $AC_3$, as shown in FIG. 15, the number of blocks C(0) of the category "0" is 4366, and the number of blocks C(1~) in which the category is larger than or equal to "1" is 1034 (=5400−4366). Therefore, the number of blocks Z(0) is 1034. The number of blocks Z(1) is assumed to depend on a ratio of the number of blocks Z(0) (=1781) in Scan $AC_2$. Namely, $Z(1)=4366 \times 1781/5400=1440$ The ratio of the number of blocks Z(2) to Z(3) is assumed to be equal to the ratio of the number of blocks Z(1) to Z(2) in Scan $AC_2$, and therefore, $Z(2)=4366 \times 1287/5400=1041$ $Z(3)=4366 \times 2332/5400=1885$ The number of blocks Z(3) corresponds to Scan $AC_3$ in a state in which the categories of Scans $AC_1$, $AC_2$, and $AC_3$ are all "0". The number of blocks Z(2) corresponds to Scan $AC_3$ in which the category is "0", in a situation in which the category of Scan $AC_1$ is other than "0" and the category of Scan $AC_2$ is "0". The number of blocks Z(1) corresponds to Scan $AC_3$ in which the category is "0", in a situation in which the category of Scan $AC_2$ is other than "0".

FIG. 19 shows the number of blocks in which the run lengths are 4, 3, 2, 1, and 0 so far Scan $AC_4$. About Scan $AC_4$ and the following Scans, the process described above is performed, so that the number of blocks Z(k) in which the run length is "k" is found.

As described above, the amount of encoded data of the first spatial frequency is estimated based on the statistical value of the encoded data of the second spatial frequency. The quantized orthogonal transformation coefficient corresponding to the first spatial frequency is provided, in the one-dimensional array for the AC component, adjacent to the quantized orthogonal transformation coefficient corresponding to the second spatial frequency.

Thus, when the run lengths as far as Scan $AC_{63}$ are obtained, a run length/category table as shown in FIGS. 20 through 23 is made for each of the categories.

FIG. 20 is a run length/category table of Scan $AC_1$, and shows a category distribution in which the run length is 0 and the category is other than "0". In Scan $AC_1$, the number of blocks in which the category is other than "0" is 866+519+300+212+54 (from FIG. 20), for a total of 1921, which represents Z(0) in FIG. 16. As shown in FIG. 15, the category distribution is 866, 519, 300, 212, and 24 in the order of the categories "1", "2", . . . "5", and the number of blocks in which the category is larger than or equal to "6" is 0. By transferring these numerals, the table shown in FIG. 20 is made.

FIG. 21 is a run length/category table of Scan $AC_2$, and shows a category distribution in which the run lengths are 0 and 1 and the category is other than "0". In Scan $AC_2$, the number of blocks in which the category is other than "0" is 1781 (=Z(0)) in total as shown in FIG. 17. As shown in FIG. 15, the category distribution is 850, 487, 315, 119, and 10 in the order of the categories "1", "2", . . . "5", and the number of blocks in which the category is larger than or equal to "6" is 0. The 850 blocks of the category "1" is divided into 302 blocks in which the run length is 0 and 548 blocks in which the run length is 1, in accordance with a ratio of Z(1) (=1287) to Z(2) (=2332) shown in FIG. 17, i.e., the ratio of the number of blocks Z'(0) (=1921) in which the run length is 0 in Scan $AC_1$ to the number of blocks Z(1) (=3479) in which the run length is 1 in Scan $AC_1$. Similarly, regarding the 487 blocks of the category "2", the number of blocks in which the run length is 0 is 173, and the number of blocks in which the run length is 314. Thus, the table shown in FIG. 21 is made.

FIG. 22 is a run length/category table of Scan $AC_3$, and shows a category distribution in which the run lengths are 0, 1, and 2 and the category is other than "0". In Scan $AC_3$, the number of blocks in which the category is other than "0" is 1034 (=Z(0)) in total as shown in FIG. 18. As shown in FIG. 15, the category distribution is 675, 220, 121, and 18 in the order of the categories "1", "2", . . . "4", and the number of blocks in which the category is larger than or equal to "5" is 0. The number of blocks of each of the categories is divided into those in which the run lengths are 0, 1, and 2, in accordance with the ratio of Z(1), Z(2), and Z(3) shown in FIG. 18.

FIG. 23 is a run length/category table of Scan $AC_4$. This table is also made by the process described above, with reference to FIGS. 15 and 19. Thus, run length/category tables as far as Scan $AC_{63}$ are made.

Then, with reference to the run length/category tables as shown in FIGS. 20 through 23, the data amount (a number of bits) in each of the Scans is calculated. For this calculation, the table of code lengths shown in FIG. 24 is used. Each of the numeral values in the table shows the code length of each of the code words of the Huffman table recommended by the JPEG. For example, the code length of the code word, in which the run length is 1 and the category is 2, is 5.

Regarding Scan $AC_1$, with reference to FIGS. 20 through 24, the number of bits of the coded word of the run length/category in all the blocks corresponding to a run length of 0 is obtained as follows:

$$866 \times 2 + 519 \times 2 + 300 \times 3 + 212 \times 4 + 24 \times 5 = 4638$$

The number of bits to multiply each block is based upon the selected category and run length, as shown in FIG. 24. Thus, for a run length of 0 and a category of 1, the number of blocks is multiplied by 2 bits, while for a run length of 3 and a category of 2 the number of blocks is multiplied by 9 bits. With respect to the discussion of Scan $AC_1$ above, run length 0 and category 1 (containing 866 blocks) is multiplied by 2 bits, while run length 0 and category 5 (containing 24 blocks) is multiplied by 5 bits. Regarding the added bits, since the numeral value of the category directly corresponds to the number of bits (see FIG. 7), the number of bits of the added bits is obtained as follows:

$$866 \times 1 + 519 \times 2 + 300 \times 3 + 212 \times 4 + 24 \times 5 = 3772$$

Therefore, the estimated data amount of Scan $AC_1$ is $$4638 + 3772 = 8410 \text{ (bits)}$$

The data amounts of Scans $AC_2$ through $AC_{63}$ are obtained by a similar calculation as for that of Scan $AC_1$.

The data amount in each of the Scans obtained as described above must be less than or equal to the set data amount shown in FIG. 13. Regarding Scan $AC_1$, for example, the data amount must be restricted to 33008 bits or less. In the example described above, since the quantization coefficient was set to "16" for the explanation, the data amount is 8410 which is much smaller than the set data amount. Therefore, actually, a quantization coefficient smaller than "16" is proper. Namely, if the estimated data amount in a situation in which the quantization coefficient is "1" is larger than 33008 bits, the quantization coefficient is increased by 1 and the estimated data amount is again calculated. By performing such a process, a quantization coefficient by which the data amount becomes less than or equal to the set data amount is obtained.

Thus, in this embodiment, a quantization coefficient corresponding to a first spatial frequency is obtained so that the estimated amount of the encoded data of the first spatial frequency is less than or equal to a predetermined value.

Generation of a quantization table as described above will be explained below with reference to a flow chart shown in FIG. 25. Note that the flow chart shows the generation of the quantization coefficients relating to Scans $AC_2$ through $AC_{63}$, and it is supposed that the quantization coefficients of the DC component and the Scan $AC_1$ have already been obtained.

In Step 101, a parameter i is set to 2. In Step 102, the quantization coefficient q is set to 1 as an initial value.

In Step 103, a category distribution of Scan $AC_i$ as shown in FIG. 15 is generated using the table of FIG. 14. For example, when the parameter i is 3 and the quantization coefficient q is 16, the category distribution is:

4366, 675, 220, 121, 18, 0, 0, 0, 0, 0, 0 in the example shown in FIG. 15.

Before the execution of Step 103, the number of blocks of the category "0" of Scan $AC_{i-1}$ has been obtained, as shown by reference P11. When the parameter i is 3 and the quantization coefficient q of Scan $AC_2$ is 16, for example, the number of blocks of the category "0" is 3619 in the example of FIG. 15. On the other hand, the distribution of the number of blocks of the category "0" of Scan $AC_{i-1}$ has been obtained, as shown by reference P12. When the parameter i is 3 and the quantization coefficient q of Scan $AC_2$ is 16, for example, the number of blocks Z(2) is 2332, the number of blocks Z(1) is 1287, and the number of blocks Z(0) is 1781, in the example shown in FIG. 17.

In Step 104, based on the category distribution in Scan $AC_i$ obtained in Step 103, the number of blocks of the category "0" in Scan $AC_{i-1}$ (reference P11), the distribution of the number of blocks of the category "0" in Scan $AC_{i-1}$, and the distribution of the number of blocks of the category "0" in Scan $AC_i$ is estimated. When the parameter i is 3 and the quantization coefficient q is 16, for example, the number of blocks Z(3) is 1885, the number of blocks Z(2) is 1041, and the number of blocks Z(1) is 1440, based on data of FIGS. 15 and 17, in the example of FIG. 18 corresponding to Scan $AC_3$.

In Step 105, the estimated data amount of the compressed data of Scan $AC_i$ is obtained. When the parameter i is 3 and the quantization coefficient q is 16, for example, based on the run length/category table of FIG. 22 and the table of code length of FIG. 24, the estimated data amount $D_i$ in Scan $AC_3$ is obtained as follows:

$$223 \times 2 + 73 \times 2 + 40 \times 3 + 6 \times 4 +$$
$$161 \times 4 + 52 \times 5 + 29 \times 7 + 4 \times 9 +$$
$$291 \times 5 + 95 \times 8 + 52 \times 10 + 8 \times 12 +$$
$$(223 + 161 + 291) + (73 + 52 + 95) \times 2 +$$
$$(40 + 29 + 52) \times 3 + (6 + 4 + 8) \times 4 =$$
$$6260 \text{ (bits)}$$

In Step 106, it is determined whether the estimated data amount $D_i$ calculated in Step 105 is less than or equal to the set data amount $S_i$ as shown in FIG. 13. In the example described regarding Step 105, since the quantization coefficient q has been set to 16, the estimated data amount $D_i$ is 6260 bits, and is much smaller than the set data amount $S_3 = 24042$ (reference SB3) shown in FIG. 13. However, since the process is started with a case in which the quantization coefficient q is 1, at the beginning, the estimated data amount $D_i$ is larger than the set data amount $S_i$. Therefore, after it is confirmed in Step 107 that the quantization coefficient q has not reached 255 yet, the quantization coefficient q is increased by one in Step 108, and the process returns to Step 103.

Then, Steps 103 through 105 are again executed, and when it is determined in Step 106 that the estimated data amount $D_i$ is less than or equal to the set data amount $S_i$, the quantization coefficient is settled. Namely, the process goes from Step 106 to Step 110, in which it is determined whether the parameter i has reached 63. When the parameter i has not reached 63, in Step 111, the difference between the set data amount $S_i$ and the estimated data amount $D_i$ is added to the set data amount $S_{i+1}$ of the next Scan. Namely, the amount which has not been used in the set data amount $S_i$ of the former Scan is assigned to the set data amount $S_{i+1}$ of the next Scan.

Then, in Step 112, the parameter i is increased by one, and then, the process returns to Step 102. Namely, Steps 102 through 108 are executed for the next Scan, so that the quantization coefficient is obtained.

When it is determined in Step 110 that the parameter i has reached 63, the process goes to Step 113, in which the quantization coefficient Qi is generated based on the quantization coefficient q, and the execution of the program ends.

The method of the first embodiment described above with reference to FIGS. 16 through 23, and in which the data amount of each Scan $AC_i$ is estimated, is a relatively simple example, and may not give an accurate estimation. A second embodiment, that produces a more accurate estimate, will now be described with reference to FIGS. 26 through 29.

Figures 26, 27:
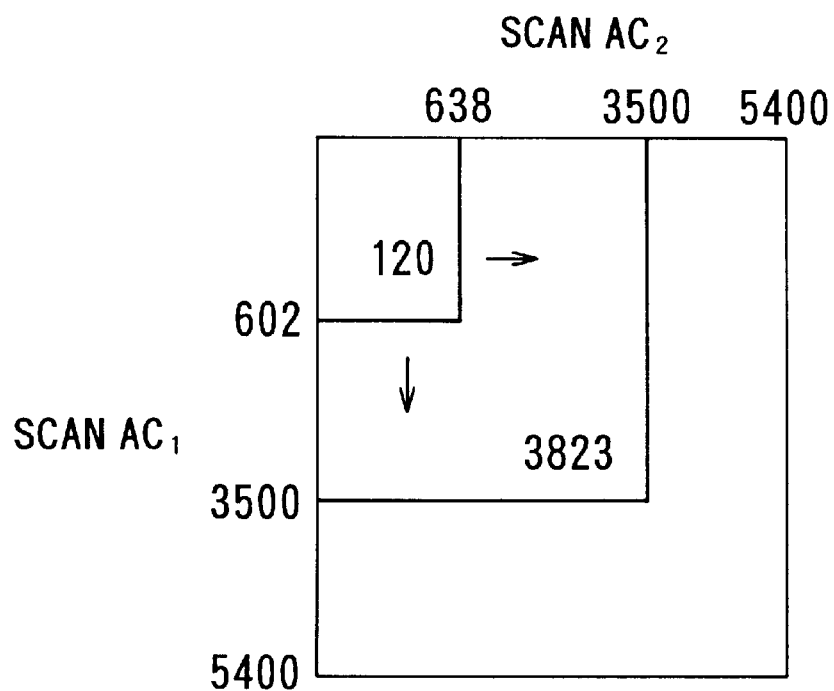
FIG. 26 is a view showing a distribution of "00" data.
FIG. 27 is a view showing a normalization of the "00" data of Scans $AC_1$ and $AC_2$.

FIG. 26 shows a distribution of "00" data, i.e., the number of blocks in which the categories are "0" both in Scan $AC_{i-1}$ and Scan $AC_i$ in a situation in which the quantization coefficient is "1", and corresponds to the category distribution table of FIG. 14. For example, the number of blocks in which the categories are "0" both in Scans $AC_1$ and $AC_2$ is 120 (reference J12), the number of blocks in which the categories are "0" both in Scans $AC_2$ and $AC_3$ is 159 (reference J23), the number of blocks in which the categories are "0" both in Scans $AC_3$ and $AC_4$ is 186 (reference J34), and the number of blocks in which the categories are "0" both in Scans $AC_{62}$ and $AC_{63}$ is 327 (reference J6263).

It is supposed that, when the number of blocks in which the categories are "0" both in Scans $AC_{i-1}$ and $AC_i$ is changed, the number of blocks would be changed in proportion to the product of a rate of change in the number of blocks of Scan $AC_{i-1}$ and a rate of change in the number of blocks of Scan $AC_i$. For example, if the number of blocks in which the category is "0" in Scan $AC_{i-1}$ and the number of blocks in which the category is "0" in Scan $AC_i$ are made double, respectively, the number of blocks in which the categories are "0" both in Scans $AC_{i-1}$ and $AC_i$ is quadrupled. Under such an assumption, based on the numbers of blocks of Scans $AC_{i-1}$ and $AC_i$ in which the categories are "0", respectively, the number of blocks, in which the categories are "0" both in Scans $AC_{i-1}$ and $AC_i$ when the quantization coefficients are changed (or increased), is estimated.

Figures 28, 29:
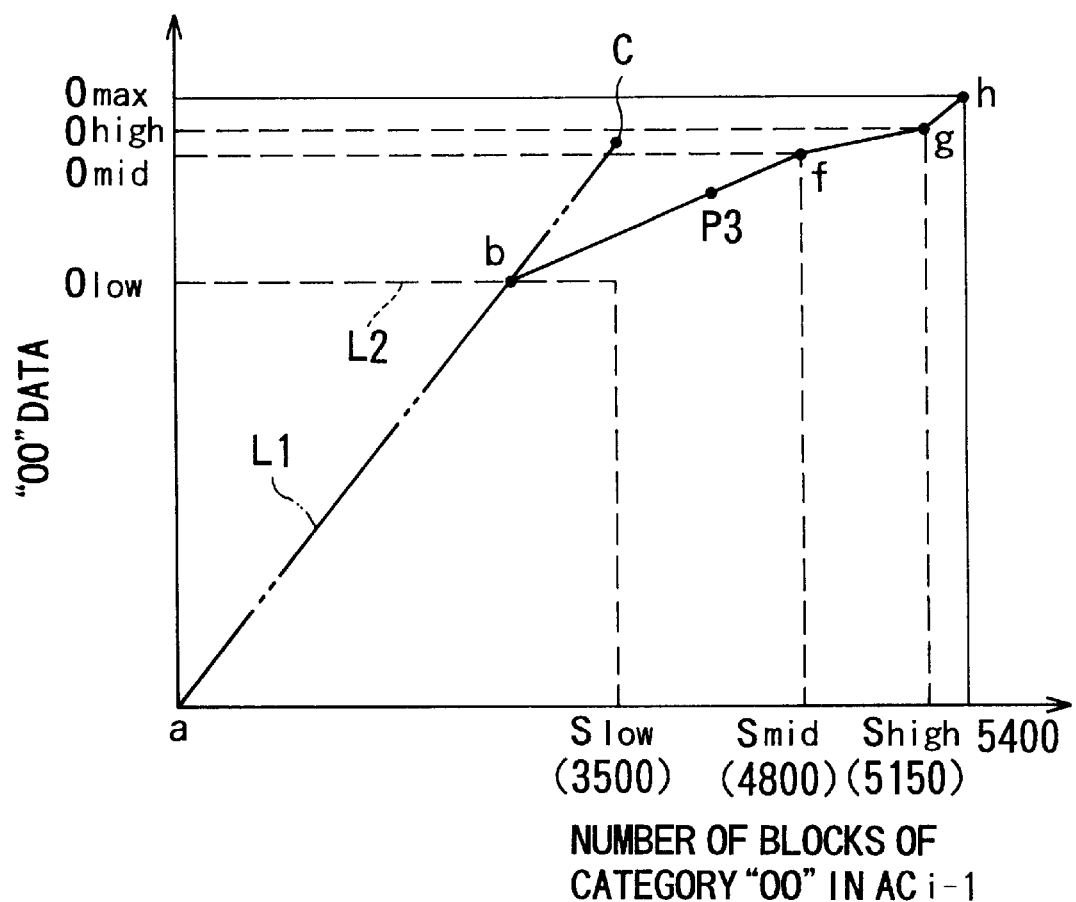
FIG. 28 is a view showing a table of the distribution of "00" normalized.
FIG. 29 is a graph showing a relationship between the number of blocks, in which the category is "0" in Scan $AC_{i-1}$, and the "00" data of Scans $AC_{i-1}$ and $AC_i$.

The distribution of "00" data is normalized by setting the standard value of the number of blocks to 3500, and is stored in a memory. For example, the number of blocks in which the categories are "0" both in Scans $AC_1$ and $AC_2$ is converted to 2823 as shown in FIG. 27 by the normalization. FIG. 28 shows a table of the normalized distribution of "00" data. For example, the "00" data of Scans $AC_1$ and $AC_2$ is 2823 (reference K12), the "00" data of Scans $AC_2$ and $AC_3$ is 3577 (reference K23), the "00" data of Scans $AC_3$ and $AC_4$ is 3280 (reference K34), the "00" data of Scans $AC_{62}$ and $AC_{63}$ is 2262 (reference K6263).

FIG. 29 is a graph in which the abscissa axis means the number of blocks, in which the category is "0" in Scan $AC_{i-1}$, and the ordinate axis means the number of blocks, in which the categories are "0" both. in Scans $AC_{i-1}$ and $AC_i$ (i.e., the "00" data). In this graph, the maximum value of the abscissa is the total block number (5400), $S_{low}$ indicates the standard value 3500, $S_{mid}$ is 4800, for example, and $S_{high}$ is 5150, for example. The maximum value of the ordinate is variable, and when the maximum value $O_{max}$ is the standard value 3500, $O_{high}$ is 3403, for example, $O_{mid}$ is 3144, for example, and $O_{low}$ is 2463, for example. Points f, g, and h at which the line graph is bent are obtained by trial and error so that the quality of the reproduced image becomes close to the original image, and the point b is changed in accordance with the number of blocks of the category "0" of Scans $AC_{i-1}$ and $AC_i$, as described above.

Obtaining point b on the graph (shown in FIG. 29) will now be explained using FIG. 15 as an example.

As shown in FIG. 15, the number of blocks of category "0" in Scan $AC_3$ is 4366, and the number of blocks of category "0" in Scan $AC_4$ is 4108.

First, with reference to the table shown in FIG. 28, $K_{34}$=3280 is obtained as the "00" data of Scans $AC_3$ and $AC_4$. Then, in FIG. 29, point c (e.g., 3280) is obtained by reading the ordinate corresponding to $S_{low}$ (3500) under a condition in which the maximum value $O_{max}$ is set to the standard value 3500. This corresponds to $K_{34}$ in FIG. 28. The bent line "abfgh" is obtained by obtaining an intersecting point b of a straight line L1, which connects the original point a to the point c, and a straight line L2, which horizontally extends from $O_{low}$.

Next, $O_{high}$ is set to 3994 and $O_{low}$ is set to 2891 by adjusting the maximum value $O_{max}$ of the ordinate to the number of blocks of Scan $AC_4$ (=4108). Under this condition, by reading the ordinate of the point P3 on the line "bf" which point corresponds to the number blocks of Scan $AC_3$ with respect to the abscissa, 3530 is obtained as the "00" data of Scans $AC_3$ and $AC_4$. This value 3530 corresponds to a sum (=3321) of Z(2), Z(3), and Z(4) in FIG. 19, and is larger than the example shown in FIG. 19. Thus, the sum is increased to 3530. Namely, according to the second estimation method, the "0" data of Scans $AC_3$ and $AC_4$ is larger than that obtained by the first estimation method.

The "00" data obtained by the second estimation method is distributed to Z(2), Z(3), and Z(4) according to a method described below. This method is the same as in the first embodiment.

For performing this distribution, the values of Z(1), Z(2), and Z(3) regarding the "00" data of Scans $AC_2$ and $AC_3$ as shown in FIG. 18 are needed, and for obtaining these Z(1), Z(2), and Z(3), the values of Z(1), and Z(2) regarding the "00" data of Scans $AC_1$ and $AC_2$ as shown in FIG. 17 are needed.

Z(1) and Z(2) of Scans $AC_1$ and $AC_2$ are obtained by making the bent line "abfgh" in the same way as described with reference to FIG. 29 and reading a point of this bent line. Namely, Z(2) is directly obtained from the bent line, and Z(1) is obtained as the difference between C(0) and Z(2). Regarding Scans $AC_2$ and $AC_3$, the sum of Z(2) and Z(3) are obtained by making the bent line "abfgh" and reading a point of this bent line. Z(1) is obtained by subtracting the sum of Z(2) and Z(3) from C(0). Each value of Z(2) and Z(3) is distributed according to a ratio of Z(1) and Z(2) of Scans $AC_1$ and $AC_2$. Thus, each value of Z(1), Z(2), and Z(3) regarding Scans $AC_2$ and $AC_3$ is obtained.

Similarly, each value of Z(2), Z(3), and Z(4) of Scans $AC_3$ and $AC_4$ is distributed according to a ratio of Z(1), Z(2), and Z(3) of Scans $AC_2$ and $AC_3$. Thus, a table for the run length/category as shown in FIG. 23 is obtained, so that the estimated data amount of the compressed data in Scan $AC_4$ is calculated. Regarding the other Scans, similar calculation is carried out, so that the estimated data amount is obtained.

A method for obtaining the data amount of Scan $AC_i$ according to a third embodiment will now be described with reference to FIGS. 30–32.

It is assumed that the number of blocks in which the run length is k in Scan $AC_{i-1}$ is Z(k), the total number of blocks in which the category is "0" in Scan $AC_{i-1}$ is $Z_{ALL}$ and the number of blocks in which the category is "0" in Scan $AC_{i-1}$ and the category is "j" in Scan $AC_i$ is $CT_j$. A modification (correction) coefficient is represented by ZW.

The number of blocks B(k,j) in which the run length is k and the category is "j" in Scan $AC_i$ is obtained by $$B(k,j)=CT_j \times Z(k)/Z_{ALL}+(1-CT_j/Z_{ALL}) \times Z(k) \times ZW/100 \quad (1)$$

The number of blocks Z(k+1) in which the run length is (k+1) in Scan $AC_i$ (i.e., the number of blocks in which the run length is k and the category is "0") is obtained by $$Z(k+1)=CT_0 \times Z(k)/Z_{ALL}+(1-CT_0/Z_{ALL}) \times Z(k) \times ZW/1000 \quad (2)$$

The modification coefficient ZW can be 0 through 1000. For example, when ZW=0, $$Z(k+1)=CT_j \times Z(k)/Z_{ALL}$$

which produces the same result as the method of the second embodiment. When ZW=1000, $$Z(k+1)=Z(k),$$

meaning that all blocks in which the run length is k in Scan $AC_{i-1}$ come to belong to category "0" in Scan $AC_i$.

In the example that will now be discussed, ZW=50. It is assumed that Z(0)=1034, Z(1)=1440, Z(2)=1041, and Z(3)= 1885 in Scan $AC_3$, and a table shown in FIG. 30 is obtained as a category distribution in Scan $AC_4$. Namely, it is supposed that, regarding 4366 blocks in which the category is "0" in Scan $AC_3$, in Scan $AC_{41}$ the number of blocks $CT_0$ in which the category is "0" is 3321, the number of blocks $CT_1$ in which the category is "1" is 655, the number of blocks $CT_2$ in which the category is "2" is 276, the number of blocks $CT_3$ in which the category is "3" is 101, the number of blocks $CT_4$ in which the category is "4" is 13, and the number of blocks in which the category is larger than "5" is 0.

As described below, the number of blocks is obtained from data of the run length 1, so that a distribution table of the run length/category as shown in FIG. 31 is obtained.

The number of blocks in which the run length is 1 and the category is "1" in Scan $AC_4$ is obtained according to formula (1). Namely, $$B(1,1)=CT_1 \times Z(1)/Z_{ALL}+(1-CT_1/Z_{ALL}) \times Z(1) \times ZW/1000=655 \times 1440/4366+(1-655/4366) \times 1440 \times 50/1000=216+61=277.$$

Similarly, the number of blocks in which the run length is 1 and the category is "2" is obtained according to formula (1). Namely, $$B(1,2)=CT_2 \times Z(1)/Z_{ALL}+(1-CT_2/Z_{ALL}) \times Z(1) \times ZW/1000= 91+67=158.$$

The number of blocks in which the run length is 1 and the category is "3" is obtained according to formula (1) as follows:

$$B(1,3)=CT_3 \times Z(1)/Z_{ALL}+(1-CT_3/Z_{ALL}) \times Z(1) \times ZW/1000=33+71=104.$$

However, $CT_3=C(3)=101$, as shown in FIG. 30, and B(1,3) cannot have a value over 101. Therefore, B(1,3) is compulsorily set not to 104, but to 101.

In a manner similar to B(1,3), regarding the number of blocks in which the run length is 1 and the category is "4", B(1,4) is compulsorily set to 13.

The number of blocks Z(2) in which the run length is 2 in Scan $AC_4$ (i.e., the number of blocks in which the run length is 1 and the category is "0") is $$Z(2)=Z(1)-(277+158+101+12)=891.$$

Regarding the number of blocks in which the run length is 2 and the category is "1", $$B(2,1)=CT_1 \times Z(1)/Z_{ALL}+(1-CT_1/Z_{ALL}) \times Z(1) \times ZW/1000=655 \times 1041/4366+(1-655/4366) \times 1041 \times 50/1000=156+44=200.$$

Regarding the number of blocks in which the run length is 2 and the category is "2", $$B(2,2)=66+49=115.$$

The number of blocks B(2,3) in which the run length is 2 and the category is "13" is 0, since the value 101 (=$CT_3$) has been assigned to B(1,3). The number of blocks B(2,4) in which the run length is 2 and the category is "4" is 0, since the value 13 (=$CT_4$) has been assigned to B(1,4).

The number of blocks Z(3) in which the run length is 3 in Scan $AC_4$ (i.e., the number of blocks in which the run length is 2 and the category is "0") is $$Z(3)=Z(2)-(200+115+0+0)=726.$$

The number of blocks in which the run length is 3 and the category is "1" might be $$B(3,1)=CT_1 \times Z(3)/Z_{ALL}+(1-CT_1/Z_{ALL}) \times Z(3) \times ZW/1000=655 \times 1885/4366+(1-655/4366) \times 1885 \times 50/1000=283+80=363.$$

However, since the total number of blocks $CT_1$ in which the category is "1" is 655, $$B(3,1)=655-277-200=178.$$

The number of blocks in which the run length is 3 and the category is "2" might be $$B(3,2)=CT_2 \times Z(3)/Z_{ALL}+(1-CT_2/Z_{ALL}) \times Z(3) \times ZW/1000=119+88=207.$$

However, since the total number of blocks $CT_2$ in which the category is "2" is 276, $$B(3,2)=276-158-115=3.$$

The number of blocks in which the run length is 3 and the category is "3" is 0 according to the calculation results of B(1,3) and B(2,3). The number of blocks in which the run length is 3 and the category is "4" is 0 according to the calculation results of B(1,4) and B(2,4).

The number of blocks Z(4) in which the run length is 4 in Scan $AC_4$ (i.e., the number of blocks in which the run length is 3 and the category is "0") is $$Z(4)=Z(3)-(178+3+0+0)=1704.$$

The number of blocks in which the run length is 0, and the numbers of blocks in which the categories are "1" through "4" are 155, 65, 24, and 3, according to the table of FIG. 30. The number of blocks Z(1) in which the run length is 1 (i.e., the number of blocks in which the run length is 0 and the category is "0") is 787 according to FIG. 30.

FIG. 32 is a table of the run length/category obtained by the method of the third embodiment described above, and corresponds to FIG. 23 related to the method of the first embodiment. As shown in FIG. 31, the number of blocks in which the run length is 4 (i.e., the number of blocks in which the run length is 3 and the category is "0") is 1704, and is larger than Z(4)=1434 which is obtained by the method of the first embodiment. Namely, it is understood that, according to the method of the third embodiment, the run length has a larger value than that of the method of the first embodiment.

In the category distribution table shown in FIG. 30, a method by which the number of blocks in which the category in Scan $AC_{i-1}$ is "0" and the category in Scan $AC_i$ is larger than or equal to "1" is obtained by using the bent line "abfgh" shown in FIG. 29.

In FIG. 29, the abscissa axis indicates the number of blocks of category "0" in Scan $AC_{i-1}$, and the ordinate axis indicates the sum of the number of blocks of the categories "0" and "1" in Scan $AC_i$. First, $O_{max}$ of the axis of ordinates is set to the sum of C(0) and C(1) (=4108+810=4918), and $O_{high}$, $O_{low}$, and $O_{low}$ are obtained in accordance with $O_{max}$. Then, a point (P3, for example) on the bent line which point corresponds to the abscissa value 4366 is read, and the ordinate corresponding to the point is read. The value of the ordinate is the sum of the number of blocks of categories "0" and "1" in Scan $AC_4$. Therefore, by subtracting the value of category "0", which has already been obtained, from the sum, the number of blocks in which the category of Scan $AC_{i-1}$ is "0" and the category of Scan $AC_i$ is "1" is obtained. Similarly, the number of blocks in which the category of Scan $AC_{i-1}$ is "0" and the category of Scan $AC_i$ is larger than or equal to "2" is obtained.

Figure 33:
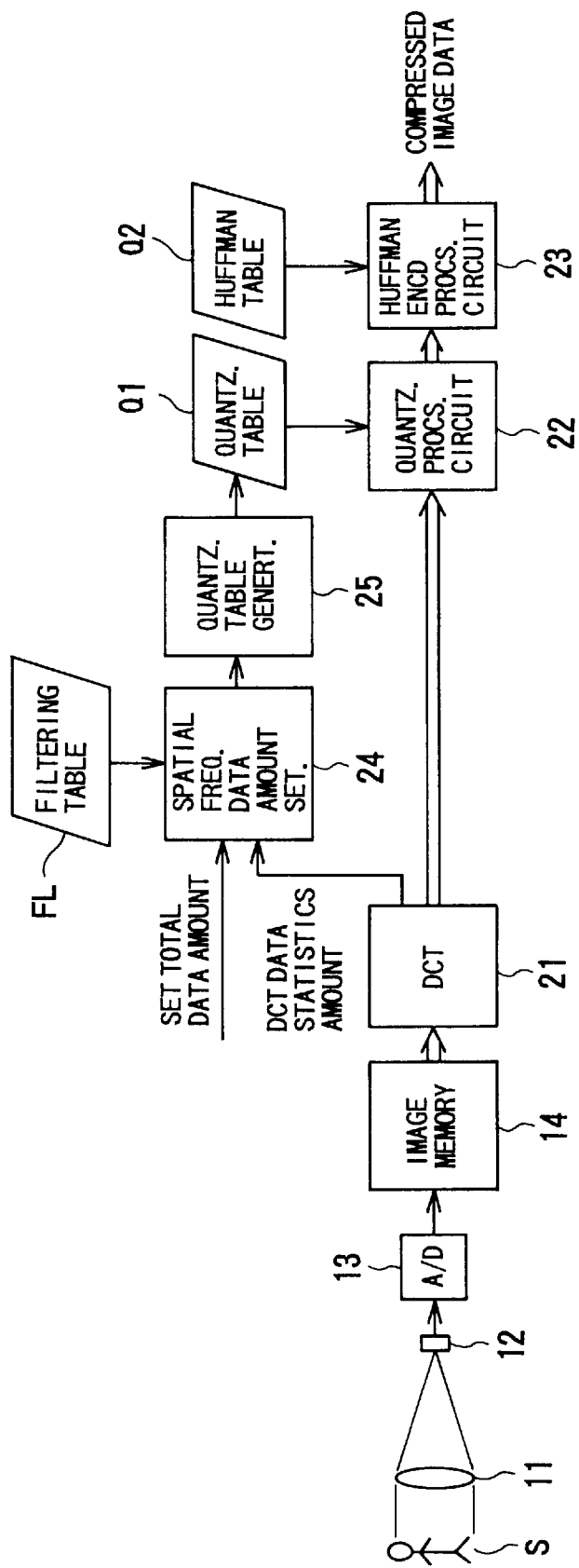
FIG. 33 is a block diagram showing an image compressing device of a second embodiment of the present invention.

FIG. 33 is a block diagram of an image signal compressing device of a fourth embodiment of the present invention.

In the fourth embodiment, the quantization table Q1 is generated based on a preset total data amount, a DCT data statistics amount, and a filtering table FL. Although the preset total data amount and the DCT data statistics amount are also used in the previous embodiments, the filtering table FL is not provided in the previous embodiments. That is, except for the use of the filtering table FL, the construction of the fourth second embodiment is basically the same as that of the first to third embodiments.

The filtering table FL is provided for setting a compression degree in which image data is compressed in each of the spatial frequencies. As described later, the filtering table FL has filtering coefficients corresponding to the spatial frequencies. The larger the degree of data compression in the spatial frequency, the larger the value each of the filtering coefficients has.

The preset total data amount, the DCT data statistics amount, and the filtering table FL are inputted into the spatial frequency data amount setting unit 24, in which a distribution of the amount of encoded data in each of the spatial frequencies (i.e., in each of the Scans) as shown in FIG. 13, for example, is set, based on the preset total data amount, the DCT data statistics amount, and the filtering table FL. When a high frequency component is intended to be cut off, for example, the distribution of the amount of encoded data is set so that the amount of encoded data regarding the high frequency component has a relatively small value. The distribution of the amount of encoded data is set by adjusting the filtering coefficients of the filtering table FL.

Figure 25:
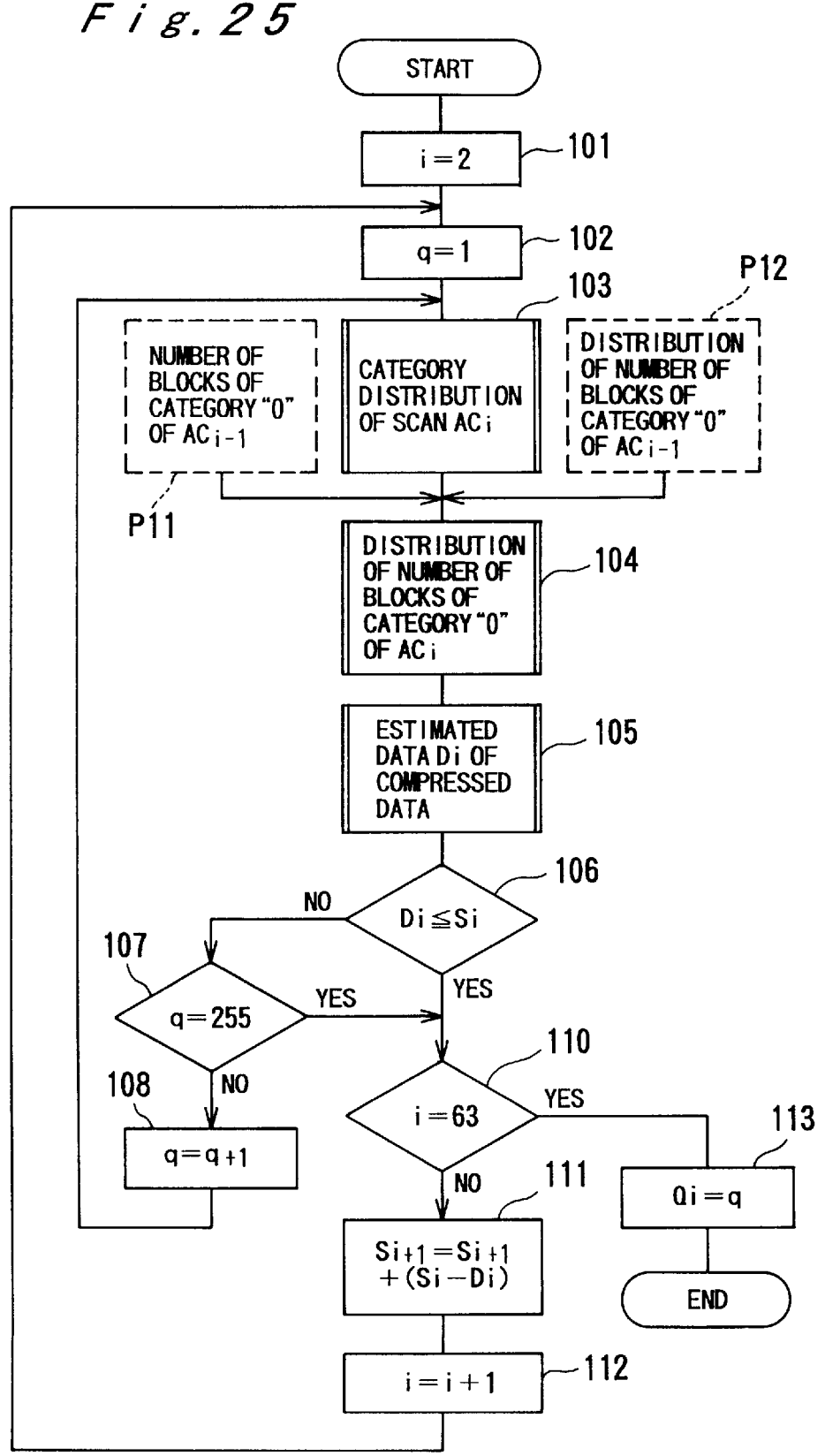
FIG. 25 is a flow chart showing a program for generating a quantization table.
Figure 34:
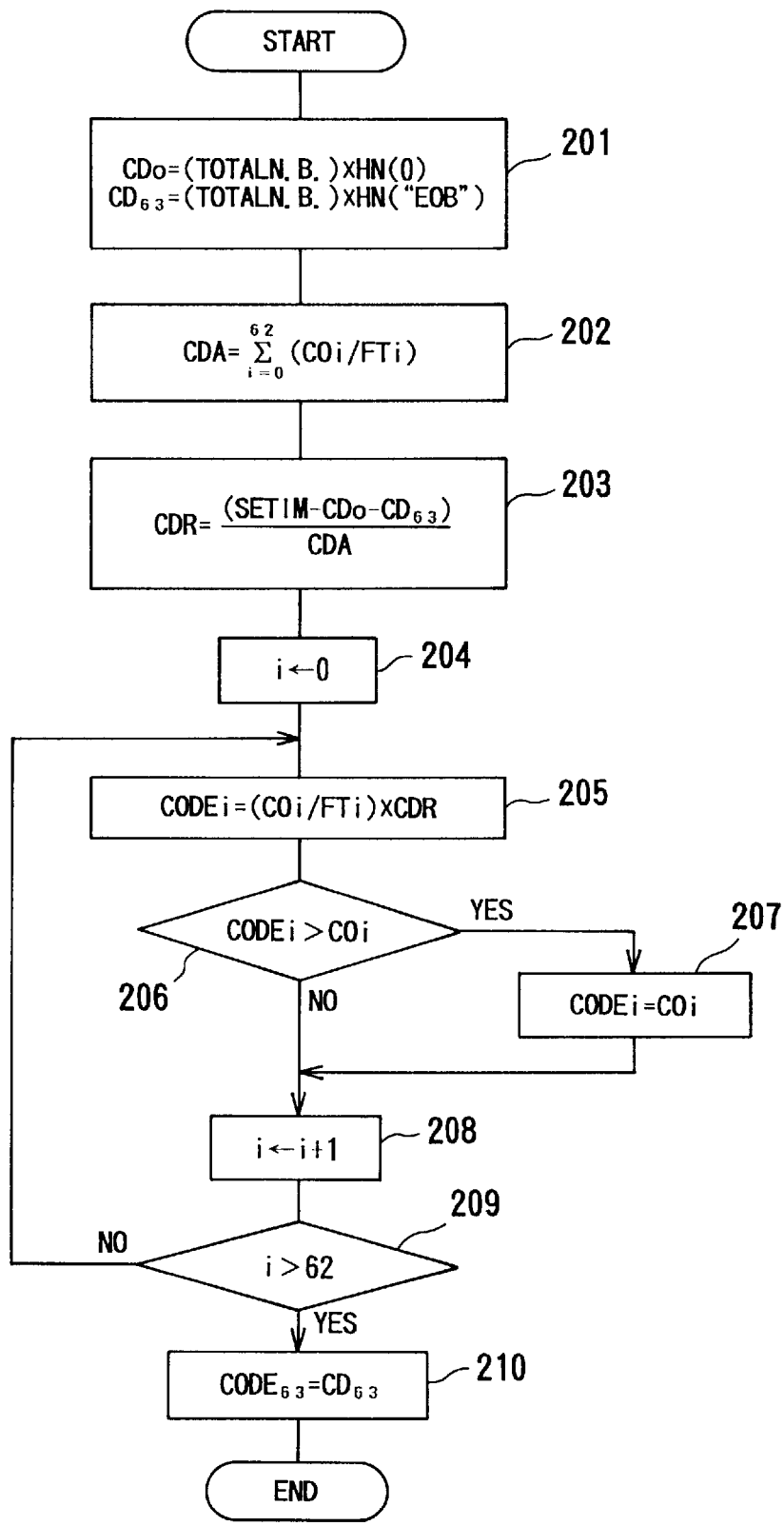
FIG. 34 is a flow chart of a program which is executed to generate a distribution of a set data amount $S_i$.

FIG. 34 is a flow chart of a program which is executed to generate a distribution of the set data amount $S_i$ (see FIG. 13) used in Step 106 of the program the flow chart of which is shown in FIG. 25.

In Step 201, regarding all of the blocks of one image frame, minimum total amounts (i.e., a number of bits) of encoded data of the DC component and Scan $AC_{63}$ are obtained, respectively. The total data amount $CD_0$ of the DC component is obtained by multiplying the total number of blocks by the minimum value HN(0)=2 of the total values of the Huffman encoded data amount and the number of added bits corresponding to the Huffman encoded data. Note that, since the total value of the Huffman encoded data amount and the number of added bits usually has a minimum value in category "0", reference HN(0) is indicated as the minimum value in FIG. 34. The total data amount $CD_{63}$ of Scan $AC_{63}$ is obtained by multiplying the total number of blocks by the data amount HN("EOB")=4 (see FIG. 8) of the end of data (EOB) in the Huffman encoding.

In Step 202, total data amount CDA regarding all of the blocks except Scan $AC_{63}$ when using the default quantization table, is obtained according to the following formula:

$$CDA = \sum_{i=1}^{62}(CO_i/FT_i)$$

wherein $CO_i$ means the amount of encoded data (the number of bits) of Scan $AC_i$ when using the default quantization table (see FIG. 12), and $FT_i$ means the value of a filtering coefficient corresponding to Scan $AC_i$, which filtering coefficient is included in the filtering table FL (see FIG. 35). Note that $$\sum_{i=1}^{62}$$

means that each term $CO_i/FT_i$ is added to the next while the parameter "i" is changed from 0 through 62.

The filtering table FL is composed of the filtering coefficients $FT_i$ corresponding to the spatial frequencies as shown in, for example, FIG. 35. The filtering coefficient $FT_0$ corresponds to the DC component, the filtering coefficients $FT_1, FT_2, \ldots FT_{63}$ correspond to Scans $AC_1, AC_2, \ldots AC_{63}$. The larger the degree of data compression in the spatial frequency, the larger the filtering coefficient. Namely, the example shown in FIG. 35 indicates a filter by which high frequency component is cut off. In the filter, a filtering coefficient of a high frequency is 20000 or 30000, so that a high frequency component is largely compressed according to formula (3).

In Step 203, a modification coefficient CDR is obtained by the following formula;

$$CDR=(SETIM-CD_0-CD_{63})/CDA \quad (4)$$

wherein SETIM means the preset total data amount, i.e. 524288 bits (64 Kbyte), for example. The smaller the total data amount CDA obtained by formula (3), the larger the value of the modification coefficient CDR, which, for example, is approximately 100.

After parameter i is set to 0 in Step 204, the amount of compressed data (the number of bits) in each of the spatial frequencies (Scan $AC_i$) is obtained in Step 205 according to the following formula;

$$CODE_i=(CO_i/FT_i) \times CDR \quad (5)$$

As shown in formula (5), the compressed data amount CODEJ is obtained by multiplying the quotient of the data amount $CO_i$, which is obtained by using the default quantization table, divided by the filtering coefficient $FT_i$, by the modification coefficient CDR.

In Step 206, it is determined whether the compressed data amount $CODE_i$ is larger than the data amount $CO_i$ obtained using the default quantization table. When the compressed data amount $CODE_i$ is larger than the data amount $CO_i$, the process goes to Step 207, in which the data amount $CO_i$ is set as the compressed data amount $CODE_i$. In other words, in this case, although the compressed data amount has a low possibility to exceed the data amount $CO_i$ whichever value the quantization coefficient q has, if the compressed data amount $CODE_i$ exceeds the data amount $CO_i$, the data amount $CO_i$ is set as the compressed data amount $CODE_i$.

Conversely, when the compressed data amount $CODE_i$ is smaller than or equal to the data amount $CO_i$, the process goes to Step 208 in which parameter i is increased by one, and then, it is determined in Step 209 whether parameter i is larger than 62. When parameter i is not larger than 62, the process returns to Step 205, and the operations described above are re-executed. Thus, when the compressed data amounts $CODE_i$ of Scan $AC_{63}$ have been set, the compressed data amount $CODE_i$ of Scan $AC_{63}$ is set to $CD_{63}$ in Step 210, and the program execution ends.

The compressed data amounts $CODE_i$ obtained as described above are the set data amount $S_i$ used in Step 106 in FIG. 25.

Figure 36:
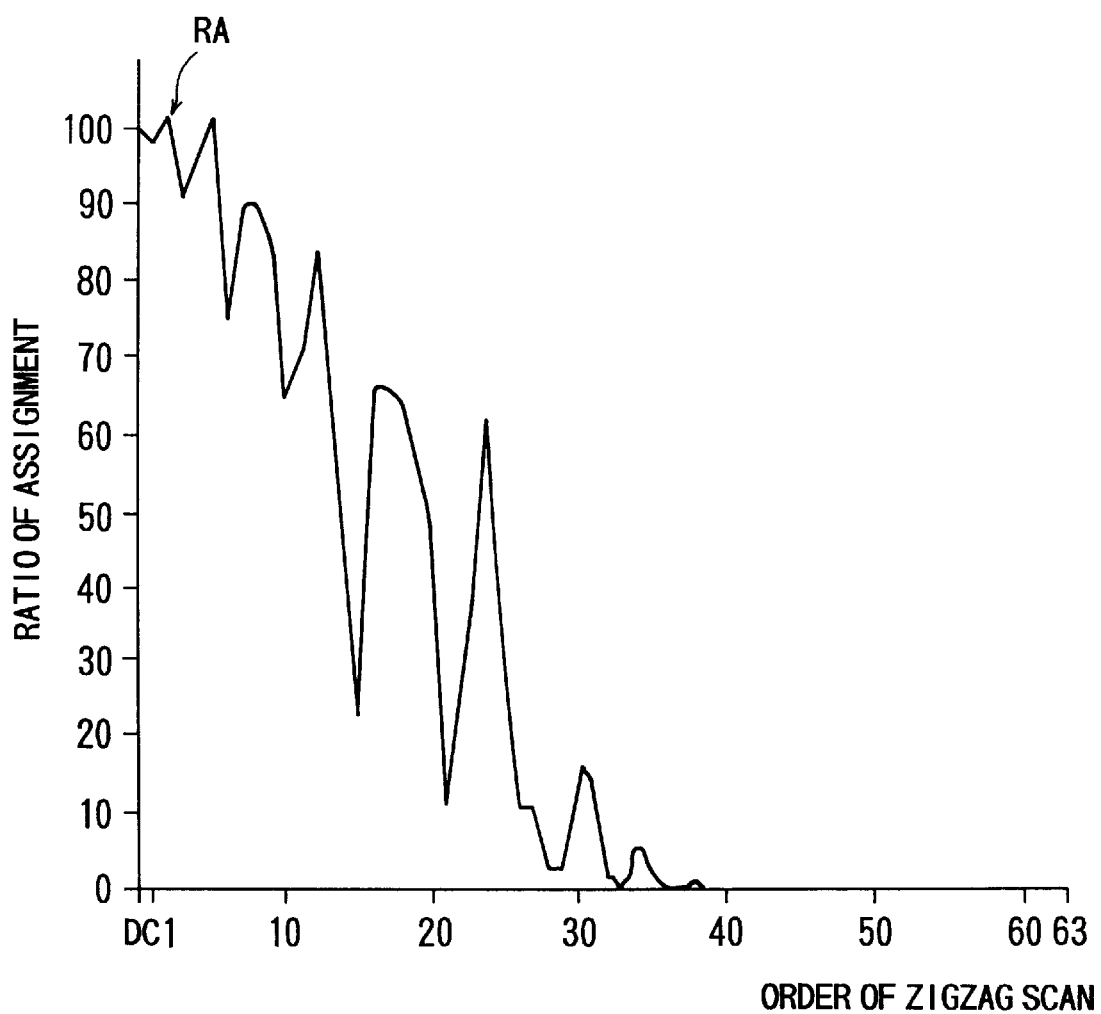
FIG. 36 is a view showing a ratio of assignment of Scans in the filtering table shown in FIG. 35.

FIG. 36 shows the ratio of assignment of Scans $AC_i$, the ratio of assignment being related to the filtering table FL shown in FIG. 35. The ratio of assignment is obtained by multiplying an inverse number of a ratio of the filtering coefficient $FT_i$ of each of the AC components to the filtering coefficient $FT_0$ of the DC component, by 100. For example, in Scan $AC_2$, since the filtering coefficient $FT_2$ is 98, the ratio of assignment is larger than 100 as shown by the reference RA. As understood from FIG. 36, the filtering table FL of FIG. 35 shows a low-pass filter, in which the ratio of assignment to a high frequency component is low. Conversely, when a filtering table FL of a high-pass filter is generated, the filtering coefficients should be set in such a manner that the ratio of assignment to a low frequency component has a small value.

FIGS. 37 and 38 show filtering tables corresponding to a first low-pass filter. The filtering table of FIG. 37 is used for luminance, and is the same as that shown in FIG. 35. The filtering table of FIG. 38 is used for color differences.

FIGS. 39 and 40 show filtering tables corresponding to an averaging filter. The filtering table of FIG. 39 is used for luminance, and the filtering table of FIG. 40 is used for color differences.

FIG. 41 shows a filtering table corresponding to a second low-pass filter. This filtering table is used for luminance and color differences.

FIG. 42 shows a filtering table corresponding to a high-pass filter. This filtering table is also used for luminance and color differences.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. HEI 7-41333 and HEI 7-41334 (both filed on Feb. 6, 1995) which are expressly incorporated herein by reference, in their entirety.

I claim:

1. An image signal compressing device, comprising:

means for applying an orthogonal transformation to original image data to obtain orthogonal transformation coefficients for each of a plurality of spatial frequencies that include a first spatial frequency and a second spatial frequency, said orthogonal transformation coefficients being deemed to be equivalent to quantized orthogonal transformation coefficients obtained using a first set of quantization coefficients;

means for encoding said quantized orthogonal transformation coefficients, said encoding means arranging said quantized orthogonal transformation coefficients in a predetermined one-dimensional array with respect to said plurality of spatial frequencies, said encoding means once performing an encoding calculation based on said arranged quantized orthogonal transformation coefficients to obtain encoded data for each of said plurality of spatial frequencies during an operation of said image signal compressing device;

means for setting a target value which defines a degree of compression by which an amount of said encoded data is compressed, said target value being replaceable by said amount of said encoded data for each of said plurality of spatial frequencies;

means for estimating an amount of said encoded data of said first spatial frequency based on a statistical value of said encoded data of said second spatial frequency, said first spatial frequency being provided adjacent to said second spatial frequency in said one-dimensional array; and means for obtaining a second quantization coefficient, associated with one quantization coefficient of said first set of quantization coefficients, corresponding to said first spatial frequency, so that said estimated amount of said encoded data of said first spatial frequency does not exceed said target value, said encoding means classifying said quantized orthogonal transformation coefficients into categories, based on a value of said quantized orthogonal transformation coefficients, and obtaining a run length based on a number of consecutive "0"'s of said quantized orthogonal transformation coefficients, said estimating means estimating said amount of said encoded data of said first spatial frequency based on said categories and said run length, said encoding means once performing said encoding calculation on said quantized orthogonal transformation coefficients after said estimating means estimates said amount of encoded data and said obtaining means obtains said second quantization coefficient.

2. The device of claim 1, wherein said orthogonal transformation applying means divides said original image data into a plurality of blocks to obtain said orthogonal transformation coefficients, said estimating means using a number of blocks classified to category "0" which corresponds to a "0" of said statistical value of said encoded data of said second spatial frequency, when estimating said amount of said encoded data of said first spatial frequency.

3. The device of claim 2, wherein said estimating means estimates said number of blocks classified to said category "0" both in said first and said second spatial frequencies, based on the number of blocks which are classified to said category "0" in said second spatial frequency.

4. The device of claim 2, wherein said estimating means estimates said number of blocks classified to category "0" in said second spatial frequency and to category "j", "j" being a positive integer, in said first spatial frequency, based on said number of blocks classified to category "0" in said second spatial frequency.

5. The device of claim 2, wherein said estimating means estimates said number of blocks classified to category "0" in both said first spatial frequency and said second spatial frequency when using a predetermined quantization coefficient, based on a category table indicating a number of blocks classified to category "0" in both said first spatial frequency and said second spatial frequency when using a quantization coefficient of "1".

6. The device of claim 2, wherein said estimation means estimates said number of blocks classified to category "0" in said second spatial frequency and to category "j", "j" being a positive integer, in said first spatial frequency, based on a category table indicating a number of blocks classified to category "0" in both said first spatial frequency and said second spatial frequency when using a quantization coefficient of "1".

7. The device of claim 1, wherein said orthogonal transformation means divides said original image data into a plurality of blocks to obtain said orthogonal transformation coefficients, said estimating means obtaining a number of blocks classified to each of said categories in each of said plurality of spatial frequencies when using a predetermined quantization coefficient, based on a number of blocks classified to a category in each of said plurality of spatial frequencies when using a quantization coefficient of "1".

8. The device of claim 1, wherein said one-dimensional array is obtained by performing a predetermined scanning operation on a two-dimensional array.

9. The device of claim 8, wherein said predetermined scanning operation comprises a zigzag scanning operation.

10. The device of claim 1, wherein said first set of quantization coefficients are all "1".

11. The device of claim 1, wherein said statistical value comprises a category distribution and a distribution of said data obtained by said encoding means.

12. An image signal compressing device, comprising:

an orthogonal transformation coefficient applying device that applies an orthogonal transformation to original image data to obtain an orthogonal transformation coefficient for each spatial frequency of a plurality of spatial frequencies, said orthogonal transformation coefficient applying device dividing said original image data into a plurality of blocks to obtain said orthogonal transformation coefficient;

a quantizer that obtains quantized orthogonal transformation coefficients using a quantization table composed of predetermined quantization coefficients;

an encoder that encodes said quantized orthogonal transformation coefficients, said quantized orthogonal transformation coefficients being arranged in a predetermined one-dimensional array with respect to said plurality of spatial frequencies, said encoder performing an encoding calculation based on said arranged quantized orthogonal transformation coefficients to obtain encoded data for each of said plurality of spatial frequencies;

a target value setting device that sets a target value defining a degree of compression by which an amount of encoded data is compressed, said target value being replaced by said amount of encoded data for each of said plurality of spatial frequencies;

an estimator that estimates said amount of encoded data for each of said plurality of spatial frequencies without having to encode said quantized orthogonal transformation coefficients, by classifying a first spatial frequency of said quantized orthogonal transformation coefficients into a plurality of categories in accordance with a value of each quantized orthogonal transformation coefficient, by obtaining a run length distribution of a category "0" of said first spatial frequency based on a number of blocks forming a single image, a number of blocks corresponding to category "0" and a number of blocks corresponding to other than category "0", a run length/category table of said first spatial frequency being generated based upon said run length distribution, a category distribution of an "i"th spatial frequency being generated, a run length distribution of category "0" of said "i"th spatial frequency being generated based upon the number of blocks of category "0" of an "i−1"th spatial frequency and a run length distribution of category "0" of said "i−1"th spatial frequency, a run length/category table of said "i"th spatial frequency being generated from i=2 through i=n, so that a run length/category table of each of a second spatial frequency through in "n"th spatial frequency is generated, an amount of encoded data obtained for each spatial frequency being based on said run length/category table of each spatial frequency and a table of code lengths of code words, determined by a combination of said category and run length; and an obtainer that obtains a modified quantization coefficient corresponding to each of said plurality of spatial frequencies, so that said estimated amount of encoded data does not exceed said target value, where "i" is a natural number and "n" represents a maximum value.

13. The image signal compressing device of claim 12, wherein said estimator estimates said amount of encoded data of said first spatial frequency based on said statistical value of said encoded data of said second spatial frequency, said estimator obtaining a number of blocks Z[0] in which a run length is "0", based on a number of blocks C[1~] in which a category does not belong to "0" in said "i+1"th spatial frequency, said estimator obtaining a number of blocks Z in which said run length is at least equal to 1 by obtaining a number of blocks C'[0] in which said category is "0" in said "i"th spatial frequency, a number of blocks Z'[0] in which said run length is "0" in said "i" spatial frequency, and a number of blocks C[0] in which said category is "0" in said "i+1"th spatial frequency.

14. The image signal compressing device of claim 13, wherein, regarding said number of blocks C[0] in which said category is "0", a number of blocks Z[k+1] in which a run length is "k+1" and a number of blocks Z[k+2] in which said run length is "k+2" in said "i+1" spatial frequency are generated in accordance with a ratio of said number of blocks Z'[k+1] in which said run length is "k+1" to said number of blocks Z'[k] in which said run length is "k" in said "i"th spatial frequency.

15. The image signal compressing device of claim 12, wherein said estimator estimates said number of blocks in which categories are "0" in both said "i"th spatial frequency and said "i+1" spatial frequency when quantization coefficients are changed, based upon a rate of change in said number of blocks in which said category is "0" in said "i+"th spatial frequency and a rate of change in said number of blocks in which said category is "0" in said "i+1"th spatial frequency, said run length being calculated for each spatial frequency in accordance with said number of blocks in which said categories are "0".

16. The image signal compressing device of claim 12, wherein said target value setting device comprises:

a default quantization table in which all quantization coefficients are "1"; and a predetermined filtering table, said target value setting device quantizing said orthogonal transformation coefficients using said default quantization table, said target value being set in accordance with said default quantization table and said predetermined filtering table.

17. An image signal compressing device, comprising:

an orthogonal transformation coefficients applying device that applies an orthogonal transformation to original image data to obtain orthogonal transformation coefficients for each spatial frequency of a plurality of spatial frequencies;

a quantizing device that quantizes said orthogonal transformation coefficients using a quantization table composed of predetermined quantization coefficients, to obtain quantized orthogonal transformation coefficients;

an encoding device that encodes said quantized orthogonal transformation coefficients in a predetermined one-dimensional array with respect to said plurality of spatial frequencies, an encoding calculation being based on said arranged quantized orthogonal transformation coefficients to obtain encoded data for each of said spatial frequency of said plurality of spatial frequencies;

a target value setting device that sets a target value defining a degree of compression by which an amount of said encoded data is compressed, said target value varying by said amount of said encoded data for each said spatial frequency of said plurality of spatial frequencies, said target value setting device having a default quantization table, in which all quantization coefficients are "1", said target value setting device further having a predetermined filtering table, said target value being set based upon a ratio of said amount of compressed image data quantized by said default quantization table for each said spatial frequency of said plurality of spatial frequencies to values of said predetermined filtering table; and an obtaining device that obtains a modified quantization coefficient corresponding to each said spatial frequency of said plurality of spatial frequencies, so that an estimated amount of said encoded data does not exceed said target value.

* * * * *